US011808857B2

(12) United States Patent
Cullen et al.

(10) Patent No.: US 11,808,857 B2
(45) Date of Patent: Nov. 7, 2023

(54) MULTI-SENSOR SUPERRESOLUTION SCANNING AND CAPTURE SYSTEM

(71) Applicant: Summer Robotics, Inc., Campbell, CA (US)

(72) Inventors: Schuyler Alexander Cullen, Santa Clara, CA (US); Gerard Dirk Smits, Los Gatos, CA (US); Steven Dean Gottke, Concord, CA (US)

(73) Assignee: Summer Robotics, Inc., Campbell, CA (US)

( * ) Notice: Subject to any disclaimer, the term of this patent is extended or adjusted under 35 U.S.C. 154(b) by 0 days.

(21) Appl. No.: 17/895,489

(22) Filed: Aug. 25, 2022

(65) Prior Publication Data

US 2023/0060421 A1    Mar. 2, 2023

Related U.S. Application Data

(60) Provisional application No. 63/260,681, filed on Aug. 27, 2021.

(51) Int. Cl.
*G02B 26/08* (2006.01)
*G02B 26/10* (2006.01)
(Continued)

(52) U.S. Cl.
CPC .......... *G01S 17/894* (2020.01); *G01S 7/4802* (2013.01); *G01S 7/4804* (2013.01); *G01S 7/4808* (2013.01);
(Continued)

(58) Field of Classification Search
CPC .............. G02B 26/0833; G02B 26/101; G02B 26/105; G01S 7/4802; G01S 7/4804;
(Continued)

(56) References Cited

U.S. PATENT DOCUMENTS 9,117,267 B2  8/2015  Francis, Jr. et al.
9,489,735 B1  11/2016  Reitmayr
(Continued)

FOREIGN PATENT DOCUMENTS

CN   109458928 A   3/2019
CN   112365585 A   2/2021
(Continued)

OTHER PUBLICATIONS

Office Communication for U.S. Appl. No. 17/876,333 dated Feb. 21, 2023, pp. 1-22.
(Continued)

*Primary Examiner* — Justin Seo
*Assistant Examiner* — Kendrick X Liu
(74) *Attorney, Agent, or Firm* — John W. Branch; Branch Partners PLLC

(57) ABSTRACT

Embodiments are directed to multi-sensor superresolution scanning and capture system. A sensing system may be employed to scan a plurality of paths across objects using beams such that the sensing system includes event sensors and image sensors and such that the image sensors are a higher resolution than the event sensors. The event sensors may be employed to provide events based on detection of the beams that are reflected by the objects. The image sensors may be employed to provide images based on the reflected the beams. Enhanced trajectories may be generated based on a plurality of first trajectories and a plurality of second trajectories such that the plurality of the first trajectories are based on the events and the plurality of paths and such that the plurality of second trajectories are based on the images and the plurality of paths.

28 Claims, 16 Drawing Sheets

(51) Int. Cl.
    *G01S 7/48*     (2006.01)
    *G01S 17/04*     (2020.01)
    *G01S 17/10*     (2020.01)
    *G01S 17/42*     (2006.01)
    *G01S 17/48*     (2006.01)
    *G01S 17/66*     (2006.01)
    *G01S 17/894*     (2020.01)
    *G02B 26/12*     (2006.01)
    *G02B 27/00*     (2006.01)
    *H04N 23/698*     (2023.01)

(52) U.S. Cl.
    CPC .............. *G01S 17/04* (2020.01); *G01S 17/10* (2013.01); *G01S 17/42* (2013.01); *G01S 17/48* (2013.01); *G01S 17/66* (2013.01); *G02B 26/0833* (2013.01); *G02B 26/101* (2013.01); *G02B 26/105* (2013.01); *G02B 26/123* (2013.01); *G02B 27/0031* (2013.01); *H04N 23/698* (2023.01)

(58) Field of Classification Search
    CPC ........ G01S 7/4808; G01S 17/04; G01S 17/10; G01S 17/42; G01S 17/48; G01S 17/66; G01S 17/894
    See application file for complete search history.

(56) References Cited

U.S. PATENT DOCUMENTS

| | | |
|---|---|---|
| 2008/0012850 A1 | 1/2008 | Keating, III |
| 2008/0165360 A1 | 7/2008 | Johnston |
| 2008/0201101 A1 | 8/2008 | Hebert et al. |
| 2009/0096994 A1* | 4/2009 | Smits .................. H04N 9/3194 353/30 |
| 2015/0378023 A1 | 12/2015 | Royo Royo et al. |
| 2017/0176575 A1* | 6/2017 | Smits .................. G01S 7/4808 |
| 2019/0128665 A1 | 5/2019 | Harendt |
| 2019/0279379 A1 | 9/2019 | Srinivasan et al. |
| 2021/0141094 A1 | 5/2021 | Russ et al. |

FOREIGN PATENT DOCUMENTS

| | | |
|---|---|---|
| CN | 112750168 A | 5/2021 |
| CN | 113313710 A | 8/2021 |
| JP | 2009-243986 A | 10/2009 |
| JP | 2020-64011 A | 4/2020 |
| JP | 2020-106475 A | 7/2020 |
| JP | 2021-167776 A | 10/2021 |
| WO | 2018000037 A1 | 1/2018 |
| WO | 2018125850 A1 | 7/2018 |
| WO | 2020080237 A1 | 4/2020 |
| WO | 2021039022 A1 | 3/2021 |
| WO | 2021140886 A1 | 7/2021 |
| WO | 2022132828 A1 | 6/2022 |

OTHER PUBLICATIONS

Office Communication for U.S. Appl. No. 17/876,333 dated Mar. 1, 2023, pp. 1-2.
International Search Report and Written Opinion for International Patent Application No. PCT/US2022/050626 dated Mar. 7, 2023, pp. 1-8.
International Search Report and Written Opinion for International Patent Application No. PCT/US2021/063399 dated Mar. 22, 2022, pp. 1-7.
International Search Report and Written Opinion for International Patent Application No. PCT/US2022/037299 dated Oct. 25, 2022, pp. 1-7.
International Search Report and Written Opinion for International Patent Application No. PCT/US2022/038724 dated Nov. 1, 2022, pp. 1-7.
International Search Report and Written Opinion for International Patent Application No. PCT/US2022/041520 dated Nov. 8, 2022, pp. 1-7.
International Search Report and Written Opinion for International Patent Application No. PCT/US2022/036006 dated Oct. 4, 2022, pp. 1-8.
International Search Report and Written Opinion for International Patent Application No. PCT/US2023/013718 dated May 30, 2023, pp. 1-7.

* cited by examiner

MULTI-SENSOR SUPERRESOLUTION SCANNING AND CAPTURE SYSTEM

CROSS-REFERENCE TO RELATED APPLICATION

This application is a Utility patent application based on previously filed U.S. Provisional Patent Application Ser. No. 63/260,681 filed on Aug. 27, 2021, the benefit of the filing date of which is hereby claimed under 35 U.S.C. § 119(e) and the contents of which is further incorporated in entirety by reference.

TECHNICAL FIELD

The present invention relates generally to machine sensing or machine vision systems, and more particularly, but not exclusively, to multi-sensor super resolution scanning and capture system.

BACKGROUND

The state of the art in robotic vision is largely based on cameras where the input to the sensing system is two-dimensional (2D) arrays of pixels that encode the amount of light that each pixel received over an exposure period, or on depth capture technologies (e.g., Time-of-Flight (ToF) cameras, structured light cameras, LIDAR, RADAR, or stereo cameras, to name a few) which provide three-dimensional (3D) point clouds, where each point in the point cloud may store its position in space with respect to the vision system, and may store any of a number of other data associated with the patch of reflecting material that the point was generated from (e.g., brightness, color, relative radial velocity, spectral composition, to name a few). Note that 3D point clouds may be represented in "frames", similar in spirit to the frames of images from cameras, meaning that they don't have a fundamental representation of continuously evolving time.

To provide useful perception output that may be used by machine vision applications, such as, robotic planning and control systems, these 2D or 3D data often need to be processed by machine vision algorithms implemented in software or hardware. In some cases, some machine vision systems may employ machine learning to determine properties or features of the world that may be salient to particular robotic tasks, such as, the location, shape orientation, material properties, object classification, object motion, relative motion of the robotic system, or the like. In many cases, neither the 2D nor 3D representations employed by conventional machine vision systems provide inherent/ native support for continuous surface representation of objects in the environment.

Furthermore, 3D capture of objects by image cameras, for instance using standard CMOS image sensors, may be imprecise without additional structure information placed on the objects. In some cases, this may become increasingly difficult if the objects being scanned may be in motion. In some cases, event sensors (e.g., event cameras) may be employed in sensing/capture applications. Event sensors may be well adapted to capture moving objects and may react faster than most frame capture cameras. However, event sensors may inherently measure less data about the scenes they survey, as they typically continuously show changes that happen at each pixel, but capture little if information there are no substantial changes in the area captured by each pixel. Also, event sensors often provide less pixel density than a same-sized image sensor (e.g., frame capture cameras); for instance, a high-end event sensor may have 1 megapixels total, whereas a high-end image sensor may have 100 megapixels total over the sensor array. Combining data from various types of sensors may be advantageous but difficult. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
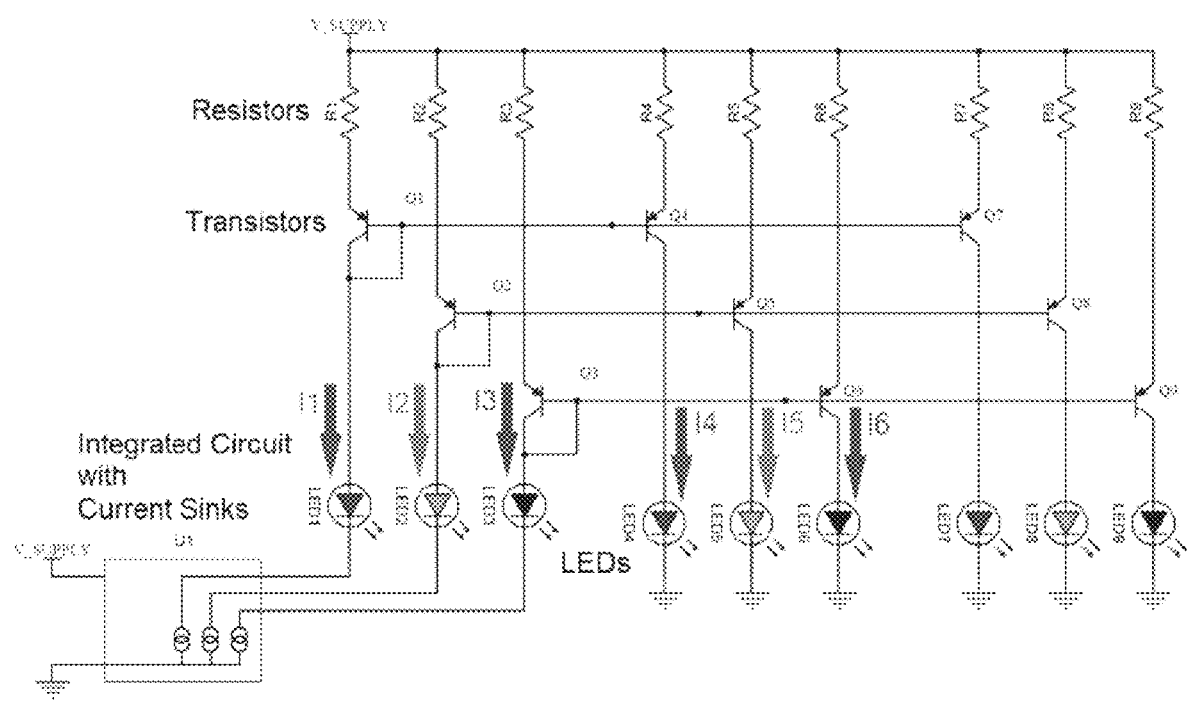
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the term "scanning signal generator" refers to a system or device that may produce a beam that may be scanned/directed to project into an environment. For example, scanning signal generators may be fast laser-based scanning devices based on dual axis microelectromechanical systems (MEMS) that are arranged to scan a laser in a defined area of interest. The characteristics of scanning signal generator may vary depending on the application or service environment. Scanning signal generator are not strictly limited to lasers or laser MEMS, other type of beam signal generators may be employed depending on the circumstances. Critical selection criteria for scanning signal generator characteristics may include beam width, beam dispersion, beam energy, wavelength(s), phase, or the like. Scanning signal generator may be selected such that they enable sufficiently precise energy reflections from scanned surfaces or scanned objects in the scanning environment of interest. The scanning signal generators may be designed to scan up to frequencies of 10s of kHz. The scanning signal generators may be controlled in a closed loop fashion with one or more processor that may provide feedback about objects in the environment and instructs the scanning signal generator to modify its amplitudes, frequencies, phase, or the like.

As used herein the term "event sensor" refers to a device or system that can detect reflected energy from scanning signal generator. Event sensors may be considered to comprise an array of detector cells that are responsive to energy reflected from scanning signal generators. Event sensors may provide outputs that indicate which detector cells are triggered and the time they are triggered. Event sensors may be considered to generate a sensor output ("events") that reports the triggered cell location and time of detection for individual cells rather than being limited reporting the state or status of every cell. For example, sensors may include event sensor cameras, SPAD arrays, SiPM arrays, or the like.

As used herein the term "image sensor" refers to a device or system that can provide electronic scene information (electronic imaging) based on light or other energy collected at surface the image sensor. Conventionally, image sensors may be comprised of charge-coupled devices (CCDs) or complementary metal oxide semi-conductors (CMOS) devices. In some cases, image sensors may be referred to as frame capture cameras.

As used herein the terms "trajectory," "surface trajectory" refers to one or more data structures that store or represent parametric representations of curve segments that may correspond to surfaces sensed by one or more sensors. Trajectories may include one or more attributes/elements that correspond to constants or coefficients of segments of one-dimensional analytical curves in three-dimensional space. Trajectories for a surface may be determined based on fitting or associating one or more sensor events to known analytical curves. Sensor events that are inconsistent with the analytical curves may be considered noise or otherwise excluded from trajectories.

As used herein the term "configuration information" refers to information that may include rule-based policies, pattern matching, scripts (e.g., computer readable instructions), or the like, that may be provided from various sources, including, configuration files, databases, user input, built-in defaults, plug-ins, extensions, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to multi-sensor superresolution scanning and capture system in accordance with one or more of the various embodiments. In one or more of the various embodiments, a sensing system may be employed to scan a plurality of paths across one or more objects using one or more beams such that the sensing system includes one or more event sensors and one or more image sensors and such that the one or more image sensors are a higher resolution than the one or more event sensors.

In one or more of the various embodiments, the one or more event sensors may be employed to provide one or more events based on detection of the one or more portions of the one or more beams that are reflected by the one or more objects.

In one or more of the various embodiments, the one or more image sensors may be employed to provide one or more images based on the one or more reflected portions of the one or more beams.

In one or more of the various embodiments, one or more enhanced trajectories may be generated based on a plurality of first trajectories and a plurality of second trajectories such that the plurality of the first trajectories are based on the one or more events and the plurality of paths and such that the plurality of second trajectories are based on the one or more images and the plurality of paths.

In one or more of the various embodiments, the one or more enhanced trajectories may be provided to a modeling engine such that the modeling engine may execute one or more actions based on the one or more enhanced trajectories and the one or more objects.

In one or more of the various embodiments, executing one or more actions based on the one or more enhanced trajectories and the one or more objects may include: generating one or more three-dimensional models of the one or more objects based on the one or more enhanced trajectories; determining image data and texture data associated with the one or more objects based on the one or more images captured by the one or more image sensors; mapping the image data and texture data to the three-dimensional model based on the one or more enhanced trajectories; or the like.

In one or more of the various embodiments, the one or more beams may be modulated such that the modulation includes an off-cycle and an on-cycle. In some embodiments, the one or more image sensors may be employed to capture a portion of the one or more images during the modulation off-cycle such that the portion of the one or more images may be provided absent the one or more portions of the one or more beams being reflected by the one or more objects. And, in some embodiments, one or more features of the one or more objects may be determined based on the portion of the one or more images that are provided absent the one or more portions of the one or more beams being reflected by the one or more objects.

In one or more of the various embodiments, the one or more image sensors provided such that one or more portions of the one or more image sensors include one or more of a color filter, a polarization filter, or a micro-lens. And, in some embodiments, the one or more portions of the one or more image sensors may be employed to capture one or more features of the one or more objects that may be associated with the one or more of a color filter, a polarization filter, or a micro-lens included in the one or more portions of the one or more image sensors.

In one or more of the various embodiments, generating one or more enhanced trajectories may include: associating one or more portions of the plurality of first trajectories with one or more portions of the plurality of the plurality of second trajectories based on an equivalence of a shape of the one or more associated portions of the plurality of first trajectories and the shape of the one or more associated portions of the plurality of second trajectories; determining time information that corresponds to one or more portions of the one or more events that are associated with the one or more associated portions of the plurality of first trajectories; including the time information in the one or more enhanced trajectories; or the like.

In one or more of the various embodiments, the generating the plurality of second trajectories may include: determining one or more centroid paths that correspond to the one or more paths based on a signal strength distribution that corresponds to the one or more portions of the one or more beams reflected by the one or more objects and detected by the one or more image sensors; employing the one or more centroid paths to generate the plurality of second trajectories; or the like.

In one or more of the various embodiments, generating the one or more enhanced trajectories may include providing a higher resolution for the one or more enhanced trajectories than other resolutions for the first and second pluralities of trajectories.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, sensing systems 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, sensing systems 118, or other computers.

Client computers 102-105 may further be configured to include a client application that enables an end-user to log into an end-user account that may be managed by another computer, such as application server computer 116, sensing systems 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by sensing systems 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, sensing systems 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of application server computer 116 or sensing systems 118 are described in more detail below in conjunction with FIG. 3. Although FIG. 1 illustrates application server computer 116 and sensing systems 118 each as a single computer, the innovations or embodiments are not so limited. For example, one or more functions of application server computer 116, sensing systems 118, or the like, may be distributed across one or more distinct network computers. Moreover, in one or more embodiments, sensing systems 118 may be implemented using a plurality of network computers. Further, in one or more of the various embodiments, application server computer 116, sensing systems 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
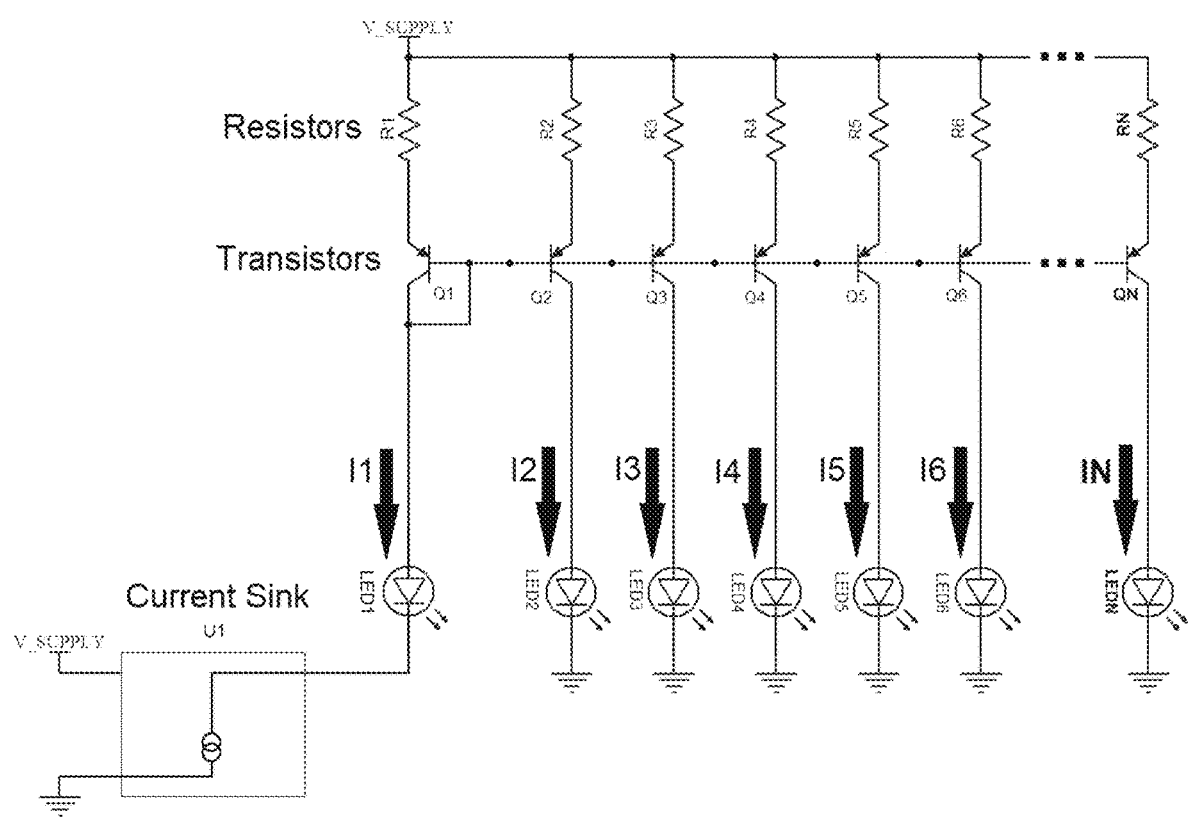
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in, file systems, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, sensor events, alerts, performance metrics, log data, API calls, or the like, combination thereof, with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
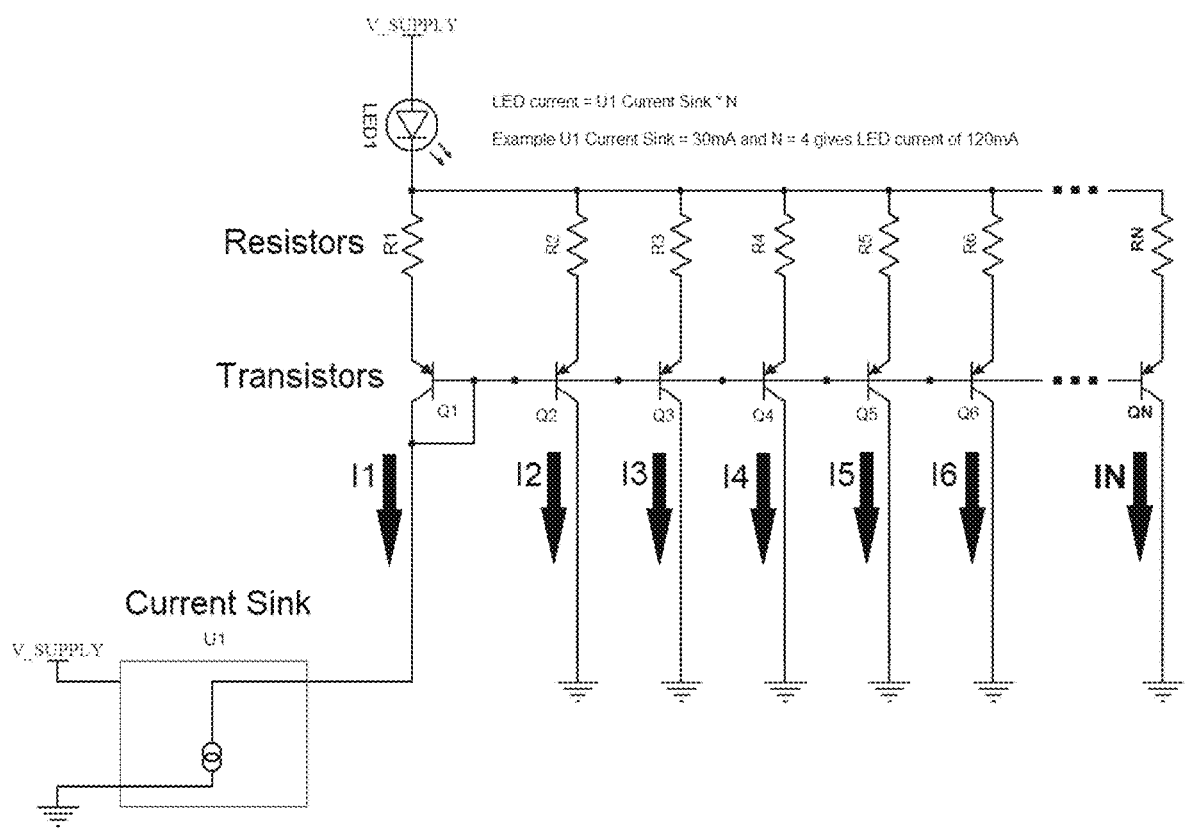
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, or sensing systems 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, sensing engine 322, modeling engine 324, calibration engine 326, web services 329, or the like, may be arranged to employ geo-location information to select one or more localization features, such as, time zones, languages, currencies, currency formatting, calendar formatting, or the like. Localization features may be used in file systems, user-interfaces, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, calibration models 314, calibration profiles 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include sensing engine 322, modeling engine 324, calibration engine 326, web services 329, or the like, which may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, sensing engine 322, modeling engine 324, calibration engine 326, web services 329, or the like, may be operative in a cloud-based computing environment. In one or more of the various embodiments, these applications, and others, which comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to sensing engine 322, modeling engine 324, calibration engine 326, web services 329, or the like, may be provisioned and de-commissioned automatically.

Also, in one or more of the various embodiments, sensing engine 322, modeling engine 324, calibration engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
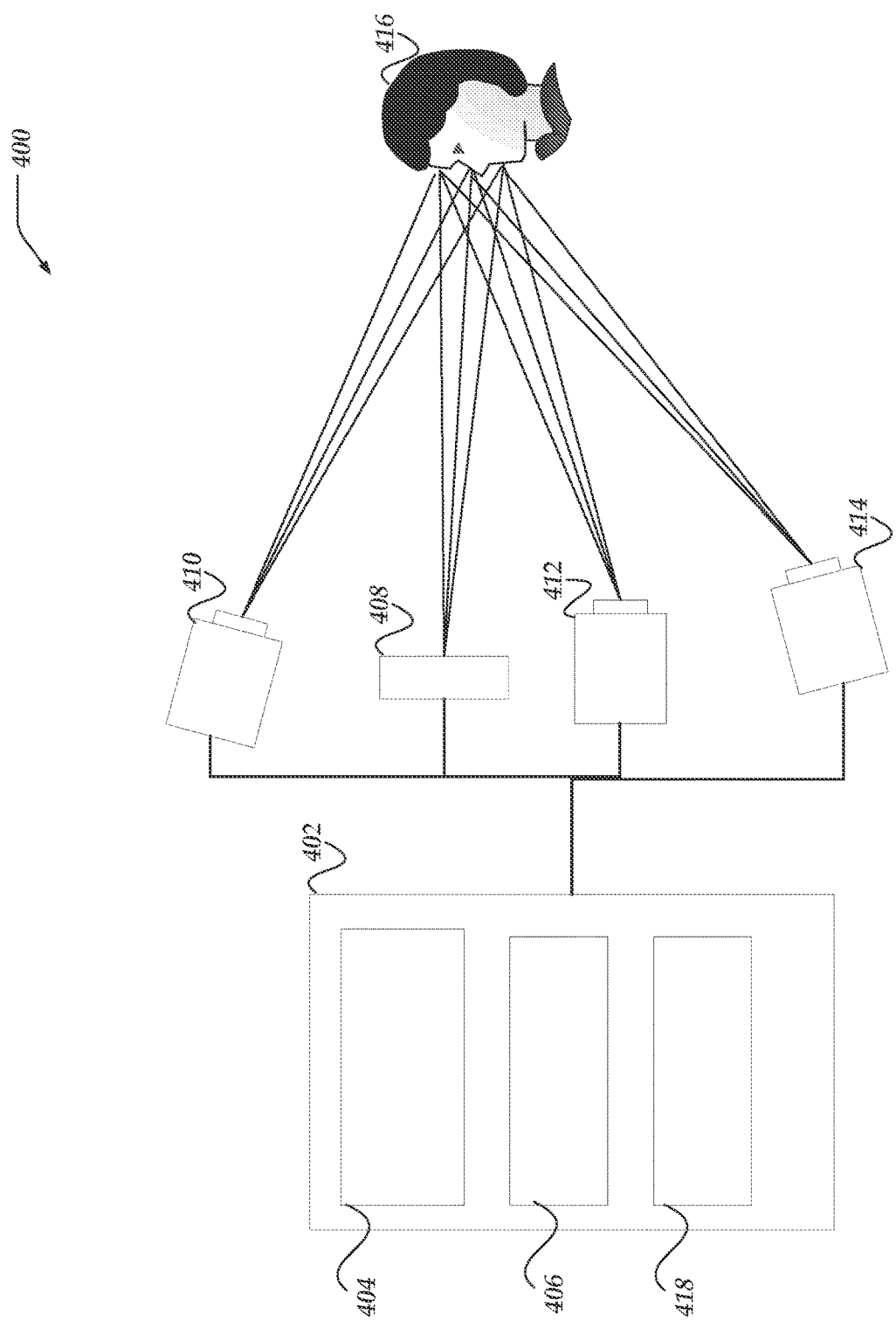
FIG. 4 illustrates a logical architecture of system 400 for multi-sensor superresolution scanning and capture system in accordance with one or more of the various embodiments.

FIG. 4 illustrates a logical architecture of system 400 for multi-sensor superresolution scanning and capture system in accordance with one or more of the various embodiments.

In this example, for some embodiments, sensing systems, such as system 400 may include one or more servers, such as sensing server 402. In some embodiments, sensing servers may be arranged to include: one or more sensing engines, such as, sensing engine 404; one or more modeling engines, such as, modeling engine 406; one or more calibration engines, such as, calibration engine 418.

Also, in some embodiments, sensing systems may include one or more signal generators that may at least generate sensor information based on where the energy from the signal generator reflects from a surface. In this example, for some embodiments, signal generator 408 may be considered to be a laser scanning system. Further, in some embodiments, sensing systems may include one or more event sensors that generate events based on the reflected signal energy (e.g., laser beam paths). Also, in some embodiments, sensing systems may include one or more image sensors that may be configured to capture scene information, reflected signal energy, or the like. In this example, for some embodiments, the sensors may be arranged to generate sensor information that corresponds to the reflected signal energy. In this example, sensors may include event sensor 410, event sensor 412, and image sensor 414.

Accordingly, in some embodiments, the 2D sensor information from each sensor may be provided to a sensing engine, such as, sensing engine 404. In some embodiments, sensing engines may be arranged to synthesize the 2D points provided by the sensors into 3D points based on triangulation, or the like.

Further, in some embodiments, sensing engines may be arranged to direct the signal generator (e.g., scanning laser 408) to follow one or more patterns based on one or more path-functions. Thus, in some embodiments, signal generators may scan the one or more objects or surface area using a known and precise scanning path that may be defined or described using one or more functions that correspond to the curve/path of the scanning.

Accordingly, in some embodiments, sensing engines may be arranged to synthesize information about the objects or surfaces scanned by the signal generate based on the 3D sensor information provided by the sensors and the known scanning curve pattern.

In some embodiments, scanning signal generator 408 may implemented using one or more fast laser scanning devices, such as a dual-axis MEMS mirror that scans a laser beam. In some embodiments, the wavelength of the laser may be in a broad range from the UV into the IR. In some embodiments, scanning signal generators may be designed to scan up to frequencies of 10s of kHz. In some embodiments, scanning signal generators may be controlled in a closed loop fashion using one or more processors that may provide feedback about the objects in the environment and instruct the scanning signal generator to adapt one or more of amplitude, frequency, phase, or the like. In some cases, for some embodiments, scanning signal generators may be arranged to periodically switch on and off, such as, at points if the scanner may be slowing before changing direction or reversing direction.

In some embodiments, system 400 may include one or more event sensors, such as, event sensor 410, event sensor 412, or the like. In some embodiments, event sensors may comprise arrays of pixels or cells that are responsive to reflected signal energy. In some embodiment, event sensors may be arranged such that some or all of the event sensors share a portion of their fields of view with one another and with the scanning signal generator. Further, in some embodiments, the relative position and poses of each sensor may be known. Also, in some embodiments, each event sensor may employ synchronized clocks. For example, in some embodiments, event sensors may be time synchronized by using a clock of one event sensor as the master clock or by using an external source that periodically sends a synchronizing signal to the event sensors. Alternatively, in some embodiments, sensors may be arranged to provide events to sensing engines independently or asynchronously of each other. In some embodiments, scanning event cameras may be employed as sensors.

Also, in some embodiments, system 400 may include one or more image sensors, such as, image sensor 414. In some embodiments, image sensors may be configured to capture one or more frames or images of the scene being sensed. In some embodiments, the captured images may include some or all of the same surface/objects being scanned by the signal generator.

Accordingly, as a beam from the scanning signal generator beam scans across the scene, the event sensors sense reflected signal energy (e.g., photons/light from lasers) and trigger events based on their cells/pixels that detect reflected signal energy in the scene. Accordingly, in some embodiments, each event (e.g., sensor event) generated by an event sensor may be determined based on cell location and a timestamp based on where and when the reflected energy is detected in each sensor. Thus, in some embodiments, each event sensor may report each sensor event independently as it is detected rather than collecting information/signal from the entire sensor array before providing the sensor event. This behavior may be considered distinguishable from image sensors that may include pixel arrays or CCDs which may 'raster scan' the entire array of cells before outputting signal data in the form of frame or images. In contrast, event sensors, such as, event sensor 410, event sensor 412, or the like, may immediately and continuously report signals (if any) from individual cells. Accordingly, the cells in an individual event sensor do not share a collective exposure time rather each cell reports its own detected events. Accordingly, in some embodiments, sensors, such as, event sensor 410, event sensor 412, or the like, may be based on event sensor cameras, single photon avalanche diode (SPAD) sensors, silicon photo-multipliers (SiPM) arrays, or the like.

Also, in some embodiments, in conjunction with events from event sensors, sensing system 400 may collect images from one or more image sensors, such as, image sensor 414. Accordingly, in one or more of the various embodiments, images may represent a snapshot in time of the scene being scanned.

Figure 5:
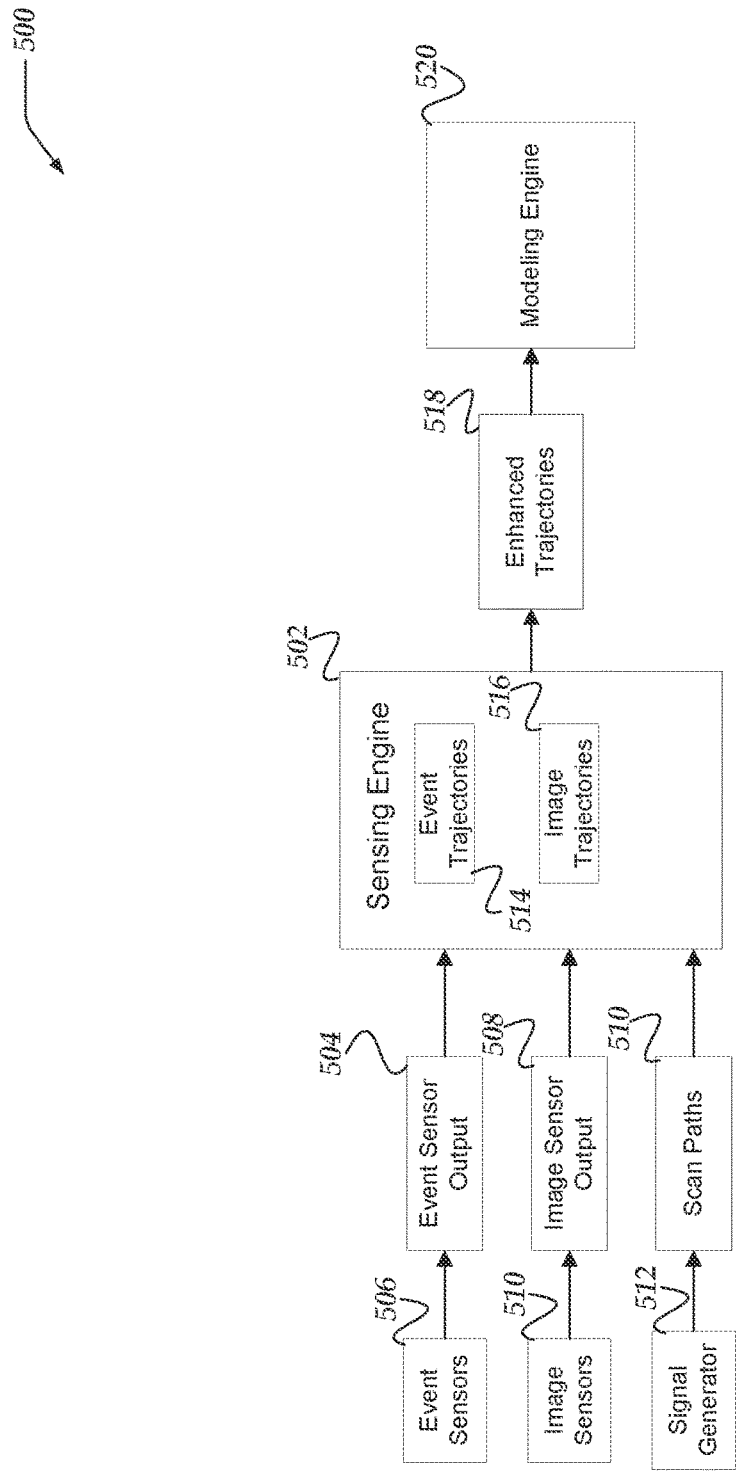
FIG. 5 illustrates a logical schematic of a system for multi-sensor superresolution scanning and capture system in accordance with one or more of the various embodiments.

FIG. 5 illustrates a logical schematic of system 500 for multi-sensor superresolution scanning and capture system in accordance with one or more of the various embodiments. In some embodiments, sensing engines, such as, sensing engine 502 may be arranged to be provided sensor outputs from one or more event sensors or one or more image sensors. In some embodiments, sensors outputs from event sensors may include information, such as, event hit location, pixel location, event timestamps, or the like, that may be associated with sensor events. Also, in some embodiments, sensor outputs may include images, frames, or the like, captured by image sensors. As described above, in some embodiments, signal generators, such as, scanning lasers may scan an area of interest such that reflections of the energy may be collected by one or more event sensors and one or more image sensors. Accordingly, in some embodiments, information from each sensor may be provided to sensing engine 502.

Also, in some embodiments, sensing engine 502 may be provided a scanning path that corresponds to the scanning path of the scanning signal generator. Accordingly, in some embodiments, sensing engine 502 may employ the scanning path to determine the path that the scanning signal generator traverses to scan the area of interest.

Accordingly, in some embodiments, sensing engine 502 may be arranged to recognize sensor events that may correspond to a surface location in three-dimensions based on the sensor output. For example, if there may be three sensors, the sensing engine may employ triangulation to compute the location in the area of interest where the scanning signal energy was reflected. One of ordinary skill in the art will appreciate that triangulation or other similar techniques may be applied to determine the scanned location if the position of the sensors is known.

In some embodiments, scanning signal generators (e.g., fast scanning lasers) may be configured to execute a precision scanning pattern. Accordingly, in some embodiments, sensing engine 502 may be provided the particular scanning path function. Also, in some embodiments, sensing engine 502 may be arranged to determine the particular scanning path based on configuration information to account for local circumstances of local requirements.

In one or more of the various embodiments, sensing engines, such as, sensing engine 502 may generate a sequence of surface trajectories that may be based the scan path and the sensor information synthesized from the sensor output 504.

Figure 6:
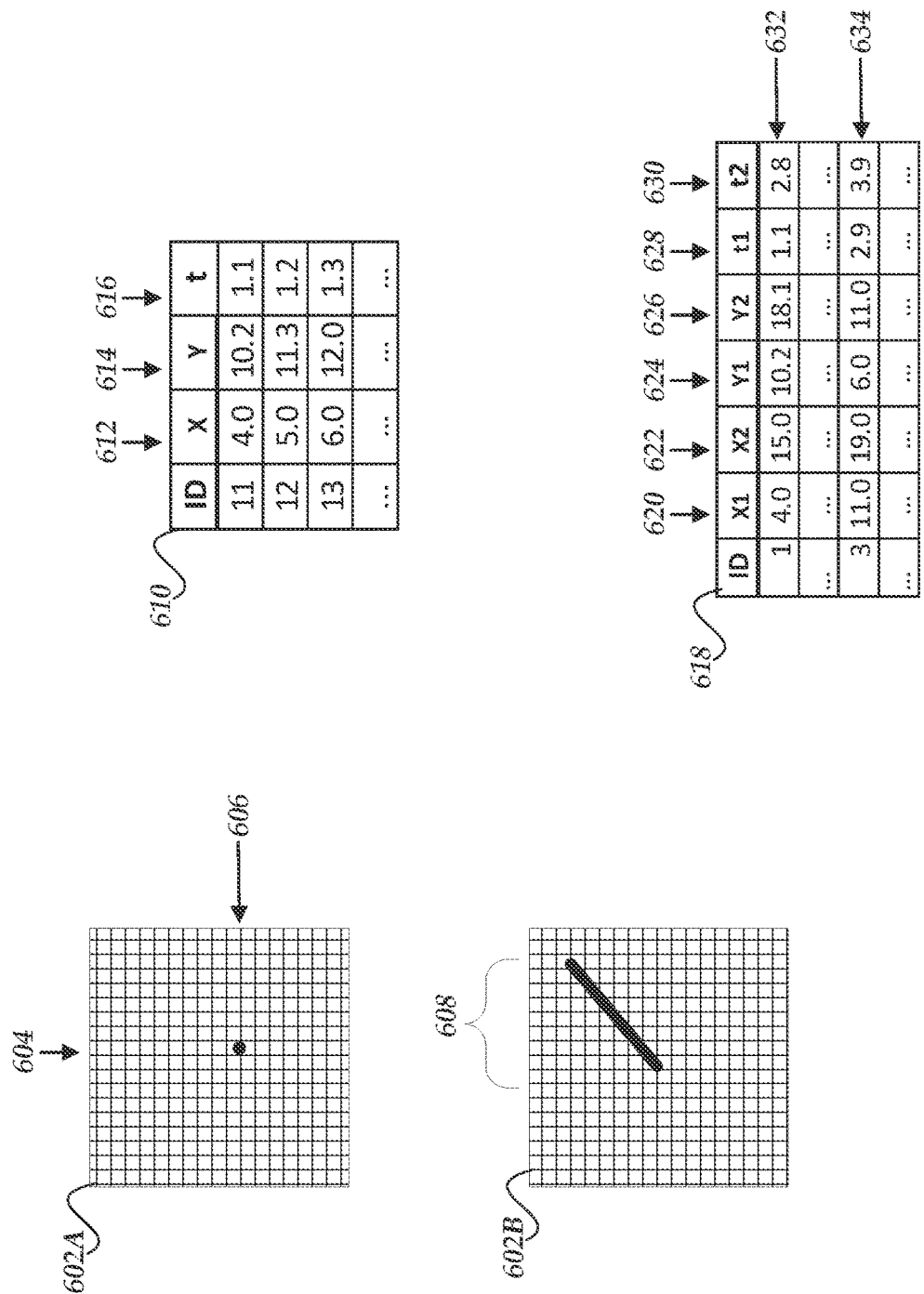
FIG. 6 illustrates a logical representation of sensors and sensor output information for multi-sensor superresolution scanning and capture system in accordance with one or more of the various embodiments.

FIG. 6 illustrates a logical representation of sensors and sensor output information for multi-sensor superresolution scanning and capture system in accordance with one or more of the various embodiments.

In one or more of the various embodiments, sensing engines may be provided sensor output from various sensors. In this example, for some embodiments, sensor 602A may be considered to represent a generic sensor that may emit signals that correspond to the precise location on the sensor where reflected energy from the scanning signal generator may be detected. For example, sensor 602A may be considered an array of detector cells that reports the cell location of the cell that has detected energy reflected from the scanning signal generator. In this example, horizontal location 604 and vertical location 606 may be considered to represent a location corresponding to the location in sensor 602 where reflected signal energy has been detected.

In one or more of the various embodiments, sensing engines may be arranged to receive sensor information for one or more detection events from one or more sensors. Accordingly, in some embodiments, sensing engines may be arranged to determine additional information about the source of the reflected energy (beam location on scanned surface) based on triangulation or other methods. In some embodiments, if sensing engines employs triangulation or other methods to locate the location of the signal beam in the scanning environment, the combined sensor information may be considered a single sensor event comprising a horizontal (x) location, vertical location (y) and time component (t). Also, in some embodiments, sensor event may include other information, such as, time-of-flight information depending on the type or capability of the sensors.

Further, as described above, the scanning signal generator (e.g., scanning laser) may be configured to traverse a precise path/curve (e.g., scanning path). Accordingly, in some embodiments, the pattern or sequence of cells in the sensors that detect reflected energy will follow a path/curve that is related to the path/curve of the scanning signal generator. Accordingly, in some embodiments, if the signal generator scans a particular path/curve a related path/curve of activated cells in the sensors may be detected. Thus, in this example, for some embodiments, path 608 may represent a sequence of cells in sensor 602B that have detected reflected energy from the scanning signal generator.

In one or more of the various embodiments, sensing engines may be arranged to fit sensor events to the scanning path curve. Accordingly, in one or more of the various embodiments, sensing engines may be arranged to predict where sensor events should occur based on the scanning path curve to determine information about the location or orientation of scanned surfaces or objects. Thus, in some embodiments, if sensing engines receive sensor events that are unassociated with the known scanning path curve, sensing engines may be arranged to perform various actions, such as, closing the current trajectory and beginning a new trajectory, discarding the sensor event as noise, or the like.

In one or more of the various embodiments, scanning path curves may be configured in advance within the limits or constraints of the scanning signal generator and the sensors. For example, a scanning signal generator may be configured or directed to scan the scanning environment using a various curves including Lissajous curves, 2D lines, or the like. In some cases, scanning path curves may be considered piecewise functions in that they may change direction or shape at different parts of the scan. For example, a 2D line scan path may be configured to change direction if the edge of the scanning environment (e.g., field-of-view) is approached.

One of ordinary skill in the art will appreciate that if an unobstructed surface is scanned, the scanning frequency, scanning path, and sensor response frequency may determine if the sensor detection path appears as a continuous path. Thus, the operational requirements of the scanning signal generator, sensor precision, sensor response frequency, or the like, may vary depending on application of the system. For example, if the scanning environment may be relatively low featured and static, the sensors may have a lower response time because the scanned environment is not changing very fast. Also, for example, if the scanning environment is dynamic or includes more features of interest, the sensors may require increased responsiveness or precision to accurately capture the paths of the reflected signal energy. Further, in some embodiments, the characteristics of the scanning signal generator may vary depending on the scanning environment. For example, if lasers are used for the scanning signal generator, the energy level, wavelength, phase, beam width, or the like, may be tuned to suit the environment.

In one or more of the various embodiments, sensing engines may be provided sensor output as a continuous stream of sensor events or sensor information that identifies the cell location in the sensor cell-array and a timestamp that corresponds to when the detection event occurred.

In this example, for some embodiments, data structure 610 may be considered a data structure for representing sensor events based on sensor output provided to a sensing engine. In this example, column 612 represents the horizontal position of the location in the scanning environment, column 614 represent a vertical position in the scanning environment, and column 616 represents the time of the event. Accordingly, in some embodiments, sensing engines may be arranged to determine which (if any) sensor events should be associated with a trajectory. In some embodiments, sensing engines may be arranged to associated sensor events with existing trajectories or create new trajectories. In some embodiments, if the sensor events fit an expected/predicted curve as determined based on the scanning path curve, sensing engines may be arranged to associate the sensor events with an existing trajectory or create a new trajectory. Also, in some cases, for some embodiments, sensing engines may be arranged to determine one or more sensor event as noise if their location deviates from a predicted path beyond a defined threshold value.

In one or more of the various embodiments, sensing engines may be arranged to determine sensor events for each individual sensor rather being limited to provide sensor events computed based on outputs from multiple sensors. For example, in some embodiments, sensing engines may be arranged to provide a data structure similar to data structure 610 to collect sensor events for individual sensors.

In some embodiments, sensing engines may be arranged to generate a sequence of trajectories that correspond to the reflected energy/signal paths detected by the sensors. In some embodiments, sensing engines may be arranged to employ one or more data structures, such as, data structure 618 to represent a trajectory that are determined based on the information captured by the sensors. In this example, data structure 610 may be table-like structure that includes columns, such as, column 620 for storing a first x-position, column 622 for storing a second x-position, column 624 for storing a first y-position, column 626 for storing a second y-position, column 628 for storing the beginning time of a trajectory, column 630 for storing an end time of a trajectory, of the like.

In this example, row 632 represents information for a first trajectory and row 634 represents information for another trajectory. As described herein, sensing engines may be arranged to employ one or more rules or heuristics to determine if one trajectory ends and another begins. In some embodiments, such heuristics may include observing the occurrence sensor events that are geometrically close or temporally close. Note, the particular components or elements of a trajectory may vary depending on the parametric representation of the analytical curve or the type of analytical curve associated with the scanning path and the shape or orientation of the scanned surfaces. Accordingly, one of ordinary skill in the art will appreciate that different types of analytical curves or curve representations may result in more or fewer parameters for each trajectory. Thus, in some embodiments, sensing engines may be arranged to determine the specific parameters for trajectories based on rules, templates, libraries, or the like, provided via configuration information to account for local circumstances or local requirements In one or more of the various embodiments, trajectories may be represented using curve parameters rather than a collection of individual points or pixels. Accordingly, in some embodiments, sensing engines may be arranged to employ one or more numerical methods to continuously fit sequences of sensor events to scanning path curves.

Further, in some embodiments, sensing engines may be arranged to employ one or more smoothing methods to improve the accuracy of trajectories or trajectory fitting. For example, in some embodiments, the scanning curve may be comprised of sensor events triggered by a scanning laser that may not be one cell wide because in some cases reflected energy may splash to neighboring cells or land on the border of two or more cells. Accordingly, in some embodiments, to better estimate the real position of the reflected signal beam as it traverses the sensor plane, sensing engines may be arranged to perform an online smoothing estimate, e.g., using a smoothing Kalman filter to predict where the scanning beam point should have been in fractional units of detector cell position and fractional units of the fundamental timestamp of the sensor. Also, in some embodiments, sensing engines may be arranged to employ a batch-based optimization routine such as weighted least squares to fit a smooth curve to continuous segments of the scanning trajectory, which may correspond to when the scanning signal generator beam was scanning over a continuous surface.

Also, in some embodiments, the scanning path may be employed to determine if trajectories begin or end. For example, if the scanning path reaches an edge of a scanning area and changes direction, in some cases, a current trajectory may be terminated while a new trajectory may be started to begin capturing information based on the new direction of the scan. Also, in some embodiments, objects or other features that occlude or obstruct scanning energy or reflected scanning energy may result in breaks in the sensor output that introduce gaps or other discontinuities that may trigger a trajectory to be closed and another trajectory to be opened subsequent to the break or gap. Further, in some embodiments, sensing engines may be configured to have a maximum length of trajectories such that a trajectory may be closed if it has collected enough sensor events or enough time has elapsed from the start of the trajectory.

Also, in some embodiments, sensing engines may be arranged to determine trajectories for individual sensor. Accordingly, in some embodiments, sensing engines may be arranged to provide data structures similar to data structure 618 for each sensor.

Figure 7:
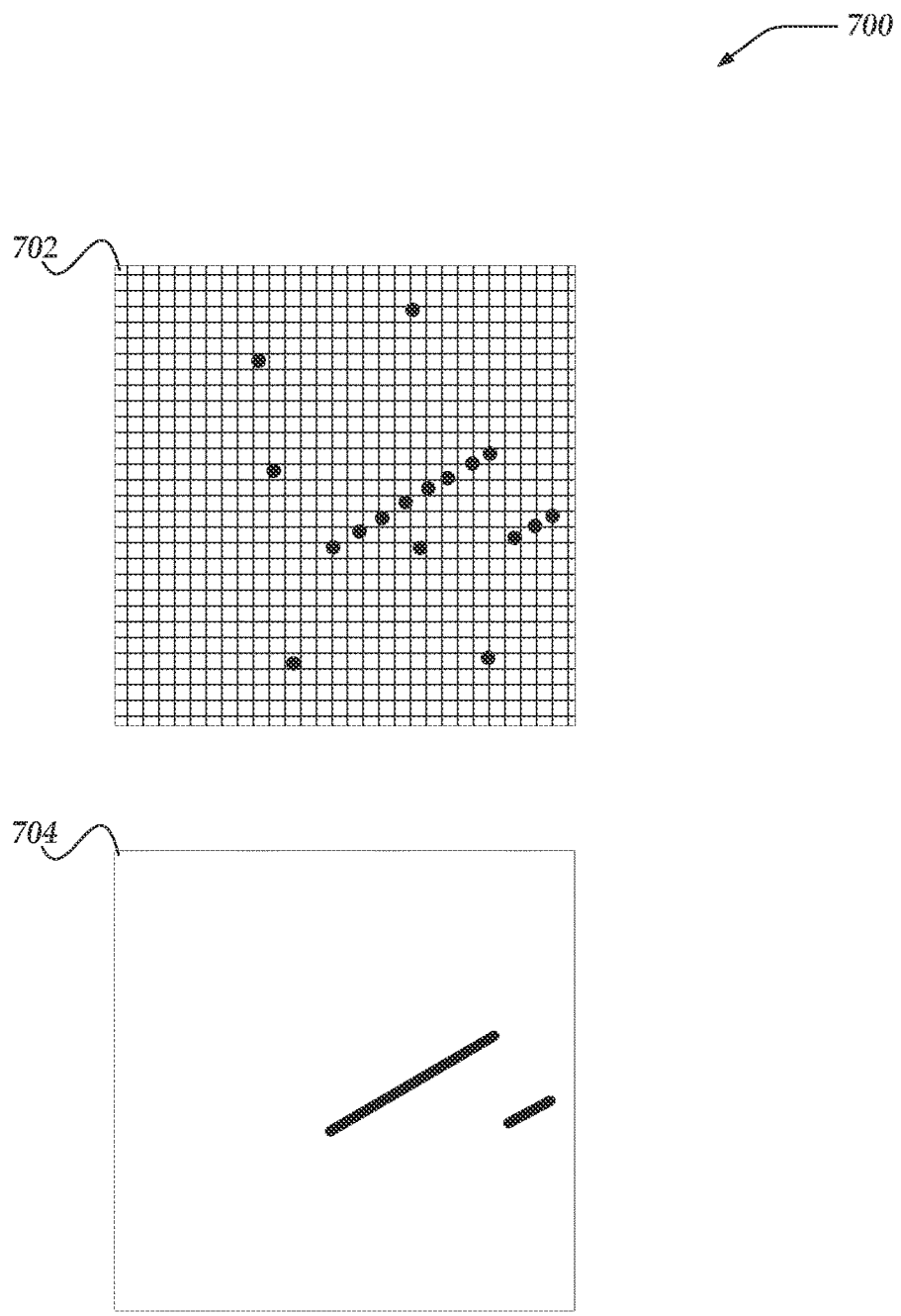
FIG. 7 illustrates a logical schematic of a system for multi-sensor superresolution scanning and capture system in accordance with one or more of the various embodiments.

FIG. 7 illustrates a logical schematic of system 700 for multi-sensor superresolution scanning and capture system in accordance with one or more of the various embodiments. As described above, in some embodiments, scanning signal generators may scan for surfaces in scanning environments. In some cases, conditions of the scanning environment or characteristics of the scanned surfaces may result in one or more spurious sensor events (e.g., noise) generated by one or more sensors. For example, sensor view 702 represents a portion of sensor events that may be generated during a scan.

In conventional machine vision applications, one or more 2D filters may be applied to a captured video image, point clusters, or the like, to attempt to separate noise events from the signals of interest. In some cases, conventional 2D image-based filters may be disadvantageous because they may employ one or more filters (e.g., weighted moving averaging, Gaussian filters, or the like) that may rely on statistical evaluation of pixel color/weight, pixel color/weight gradients, pixel distribution/clustering, or the like. Accordingly, in some cases, conventional 2D image filtering may be inherently fuzzy and highly dependent on application/environmental assumptions. Also, in some cases, conventional noise detection/noise reduction methods may erroneously miss some noise events while at the same time misclassifying one or more scene events as noise.

In contrast, in some embodiments, sensing engines may be arranged to associate sensor events into trajectories based on precise heuristics, such as, nearness in time and location that may be used to fit sensor events to analytical curves that may be predicted based on the scanning path. Because scanning paths are defined in advance, sensing engines may be arranged to predict which sensor events should be included in the same trajectory. See, trajectory view 704.

Further, in some embodiments, if surface or object features create gaps or breaks in trajectories, sensing engines may be arranged to close the current trajectory and start a new trajectory as soon as one may be recognized.

Also, in some embodiments, sensing engines may be arranged to determine trajectories directly from sensor events having the form (x, y, t) rather than employing fuzzy pattern matching or pattern recognition methods. Thus, in some embodiments, sensing engines may be arranged to accurately compute distance, direction, or the like, rather than relying fuzzy machine vision methods to distinguish noise from sensor events that should be in the same trajectory.

In one or more of the various embodiments, calibration engines may be arranged to employ rules, instructions, heuristics, or the like, for classifying sensor events as noise that may be provided via configuration information to account for local requirements or local circumstances that may be associated with a sensing applications or sensors.

Figure 8:
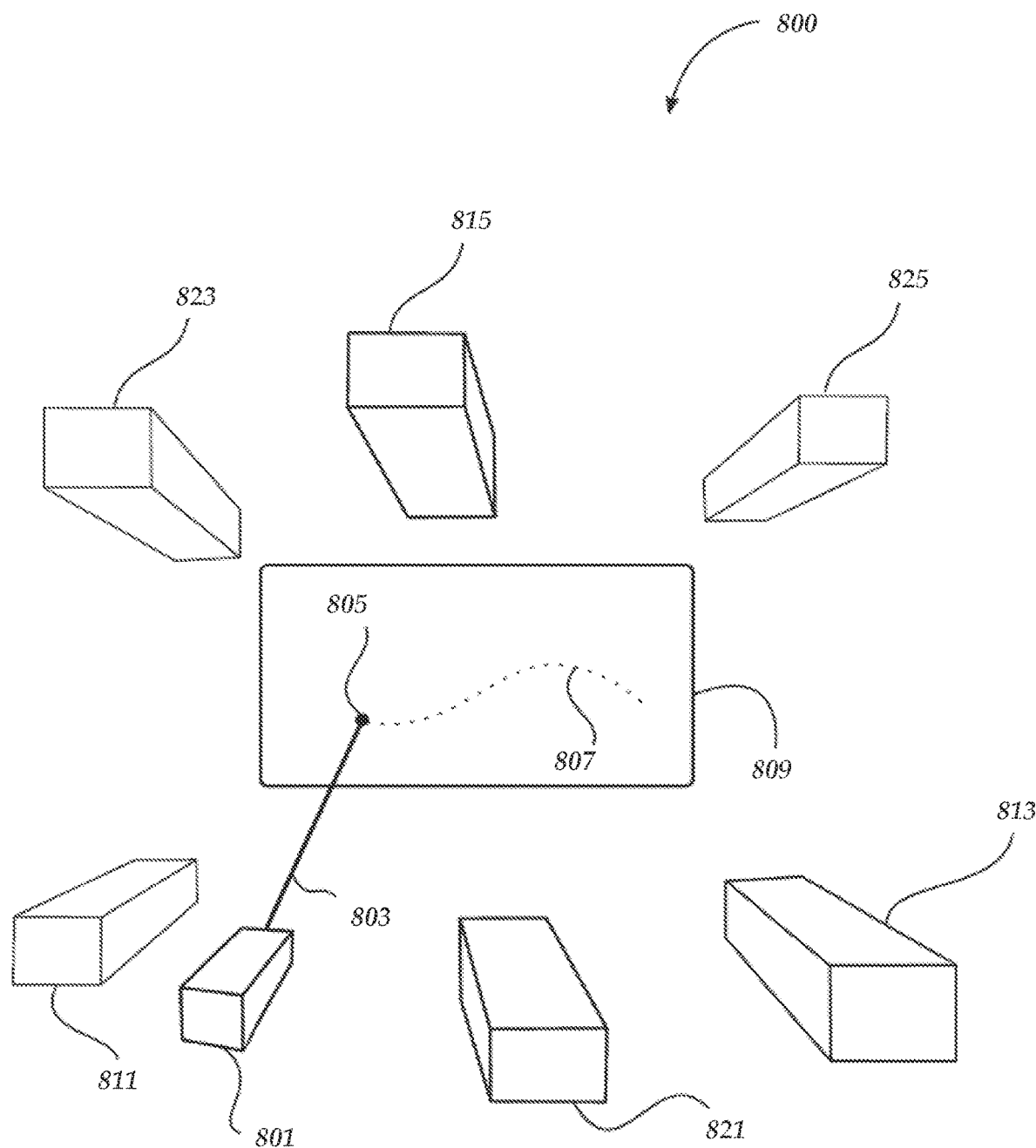
FIG. 8 shows a logical schematic of a multi-camera sensing system in accordance with one or more of the various embodiments.

FIG. 8 shows a logical schematic of multi-camera sensing system 800 in accordance with one or more of the various embodiments.

In one or more of the various embodiments, system 800 may be considered a multi-camera sensing system that may be capable of superresolution scanning of a scene. In some embodiments, a signal generator (e.g., laser) 801 may be configured to scan patterns across the scene, in this case across an object 809. In some embodiments, a signal generator may project a beam, such as, beam 803 to scan a spot 805 by tracing a path 807 across the object or objects in the scene. In some embodiments, image sensor 811, image sensor 813, and image sensor 815 may be considered frame capture cameras arranged to capture images of the scene.

In one or more of the various embodiments, event sensor 821, event sensor 823, and event sensor 825 may be event sensors arranged to capture one or more portions or all of the same scene as the image sensors. In some embodiments, event sensors may be arranged to trigger on light level differences at a pixel level. Accordingly, in some embodiments, each pixel may trigger up to the time resolution of a corresponding event sensor, which may be as fast as 1 microsecond. Also, in some cases, for some embodiments, faster times may be possible if the event sensor may be based on a SPAD (single photon avalanche photo-diode) image sensor array, or the like. In this example, sensing system 800 may include three image sensors and three event sensors, but other configurations or combinations of sensors may be possible. In some embodiments, there may be one or more event cameras included in system 800, as well as one or more image sensors. in some cases, for some embodiments, the various sensors in systems, such as, system 800 may be configured such that there may be substantial overlap in the fields of views of each of the sensors with all of the rest. Also, in some embodiments, one or more of the sensor may have overlap of fields of view with a subset of the other sensors in the system. In another embodiment, multiple beams from one or more signal generators may be scanned across the objects in the fields of view of the sensors simultaneously from one or more signal generators, such as, lasers.

Figure 9A:
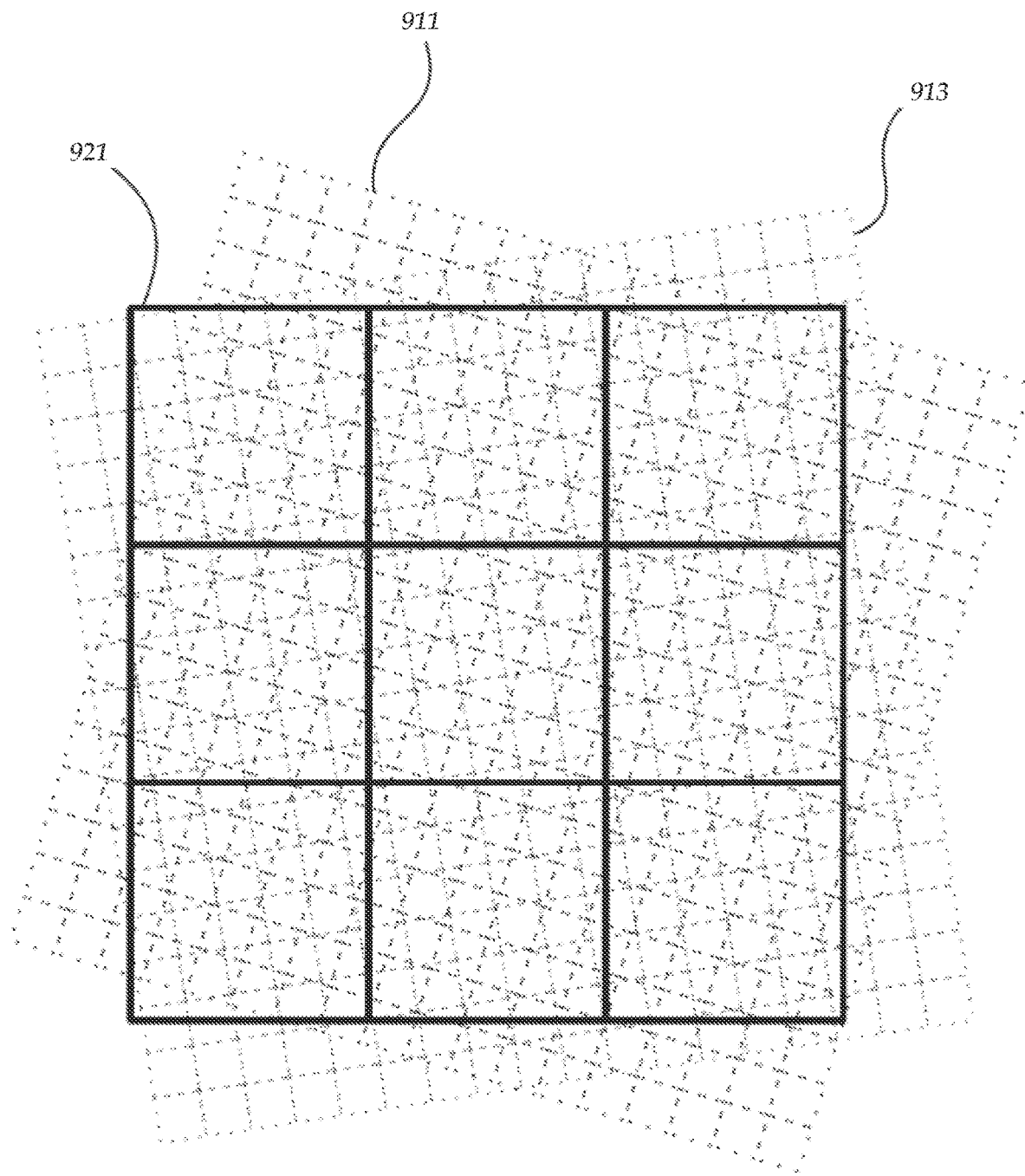
FIG. 9A illustrates a logical schematic of a close-up view of part of the field of view of some sensors of a sensing system in accordance with one or more of the various embodiments.

FIG. 9A illustrates a logical schematic of a close-up view of part of the field of view of some sensors of system 800 in accordance with one or more of the various embodiments. In some embodiments, sensor may be focused on object 809, for example. In particular, details from three of the sensors are depicted.

In this example, grid 911 may be a subset of the pixels of image sensor 811 as imaged from the surface of the object in the scene. Grid 921 may be a subset of the pixels of event sensor 821 as imaged from the surface of the object in the scene, overlaid on top of grid 911 showing that both subsets of pixels from each sensor are imaging a similar part of the object. Similarly, grid 913 may be a subset of image sensor 813 as imaged on the same surface. As described above, in some embodiments, image sensor 811 and image sensor 813 may be considered to frame capture cameras with a higher pixel density than event sensor 821, and this may be indicated by the disparities in size between grids 911/913 and 921. One of ordinary skill in the art will appreciate that the positioning and rotation of the grids may be relatively arbitrary depending on configuration of the sensing system or the scanning environment/application; accordingly, there may be no need to precisely align either rotation angles nor to translate them to a common origin. Alignment between various sensors would be imprecise or skewed in any case, since each sensor, whether event sensor or image sensor, may be measuring the object from a different angle, distance, and perspective. For illustration, the various grids are displayed uniformly, but in practice they may be distorted somewhat from both the shift in perspective of each sensor, but also because most objects that are scanned have 3D features that introduce their own changes in the receptive field of the imaged pixels.

Figure 9B:
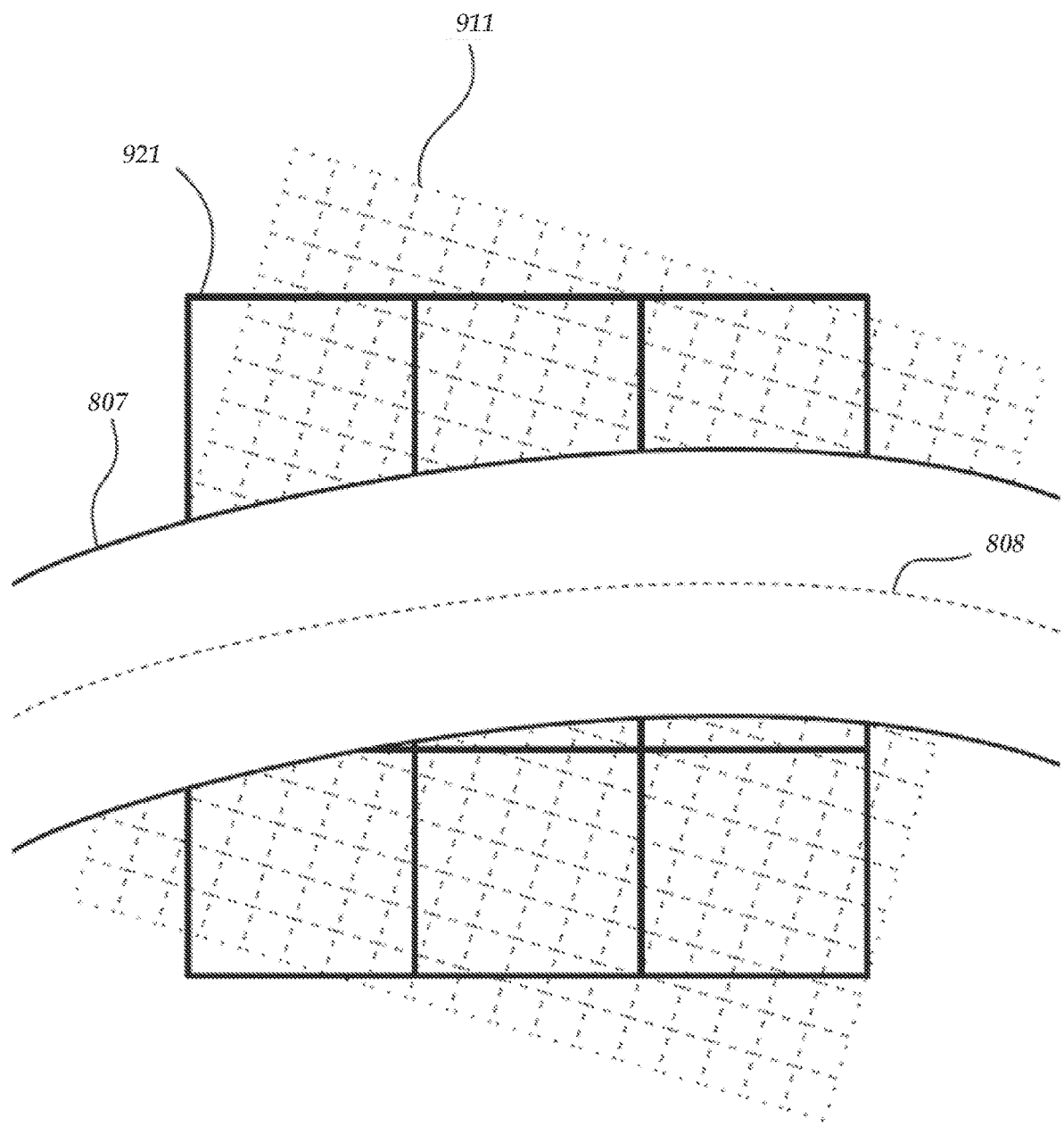
FIG. 9B shows a close-up view of the field of view of sensors in a sensing system in accordance with one or more of the various embodiments.

FIG. 9B illustrates a logical schematic of a close-up view of part of the field of view of some sensors of system 800 in accordance with one or more of the various embodiments. In some embodiments, sensor may be focused on object 809, for example. In particular, details from three of the sensors are depicted.

FIG. 9B shows the same close-up view of the field of view as in FIG. 9A, but overlaying the path 807 of the laser spot 805 as it traces across the object 809 in accordance with one or more of the various embodiments; only grids 911 and 921 are shown, though in practice, all event sensors and all image sensors may be viewing the scanning-environment/scene simultaneously. In this example, the laser spot size may be focused such that the effective width of the beam may be similar to the width of a single pixel as imaged on the event sensor 821, but in other variants, the size of the beam may be smaller or larger than the event sensor pixel as imaged. Though it may be possible that the beam intensity profile could be fairly flat across the width of the beam spot, it may be more likely that the beam intensity profile may be similar to that of a Gaussian shape, where the brightest portion may be in the center of the beam. This brightest portion would then trace out the center of the beam path shown by line 808.

Figure 9C:
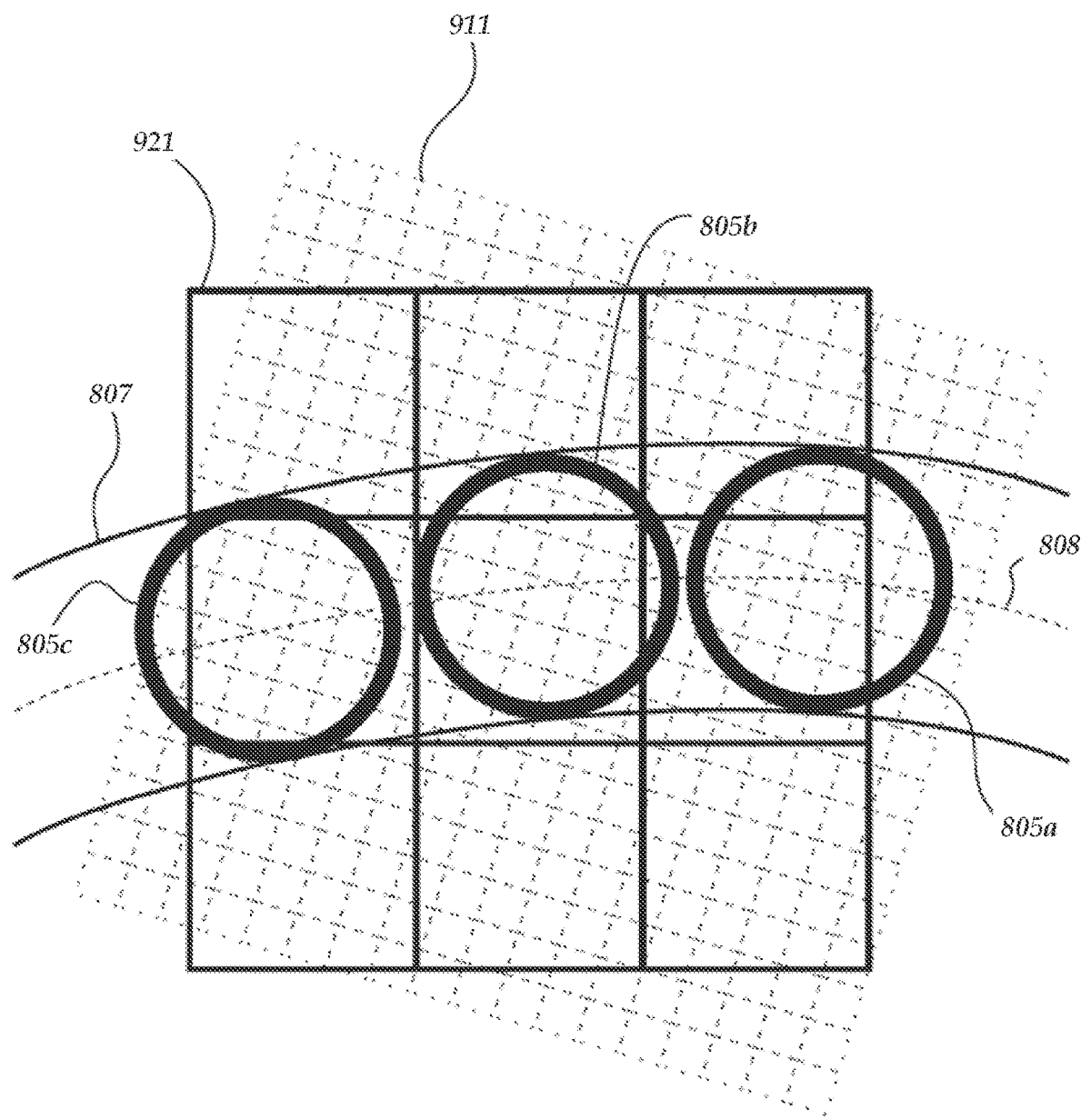
FIG. 9C shows positions of a laser beam spot as it traces the path along an object in accordance with one or more of the various embodiments.

FIG. 9C shows positions of the laser spot 805 as it traces the path along the object by circles 805a, 805b, and 805c in accordance with one or more of the various embodiments. These circles are not representative of individual spots, but instead diagrams showing where the laser spot lies on the object at different times as the beam moves along the path 807. In some embodiments, signal generators, such as, lasers may be operated in a CW (continuous wave) mode. Also, in some embodiments, the signal generator may be modulated or pulsed in some to conform to a defined pattern so that the beam turns on and off quickly; in an example, spots 805a-c might be representative of this.

In one or more of the various embodiments, each type of sensor captures different kinds of data about the laser beam over its entire path. The event sensor 821 has a relatively coarse resolution compared to the image sensor. In addition, event sensors typically trigger in a binary fashion. If there may be enough light change to trigger a particular event pixel, it will send out an event at that position with a substantially exact timestamp down to the time resolution of the sensor, but if not enough light reaches a pixel, there will be no signal event outside of other noise events. Thus an event sensor may not give a reliable grayscale output. In contrast, image sensors, such as, image sensor 911 may provide much finer resolution as compared to event sensors. In some embodiments, pixels of the image sensor may also be read out in grayscale based on the light received during its collection time per frame. Using both the shape of the beam profile, as well as the grayscale intensities over the beam path trajectories, an accurate centroid of the path 808 may be calculated. However, often image sensors may have slower capture rates than event sensors. Also, image sensors, which may be equipped with a global shutter so that all pixels can be read from the same light exposure, may provide limited or crude time information, with an effective timestamp on all of its pixels somewhere during the exposure. For example, an image sensor with a frame rate of 200 Hz would still have at best a time precision of 5 ms.

Figure 10A:
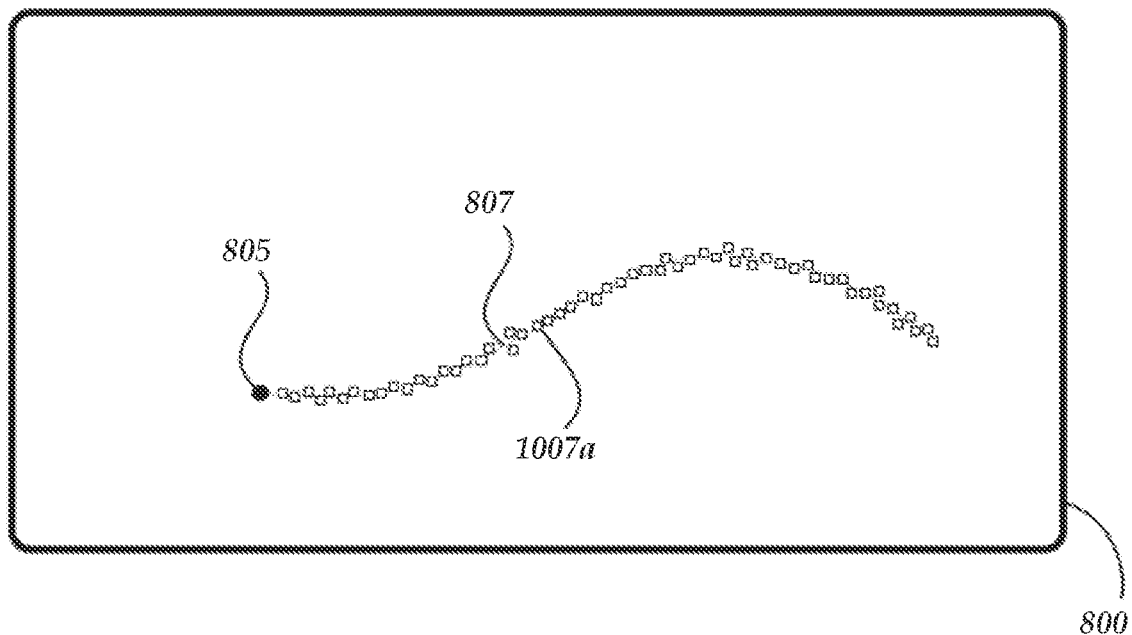
FIG. 10A shows a close-up view of an object as signal generator beam may be traced along a path in accordance with one or more of the various embodiments.
Figure 10B:
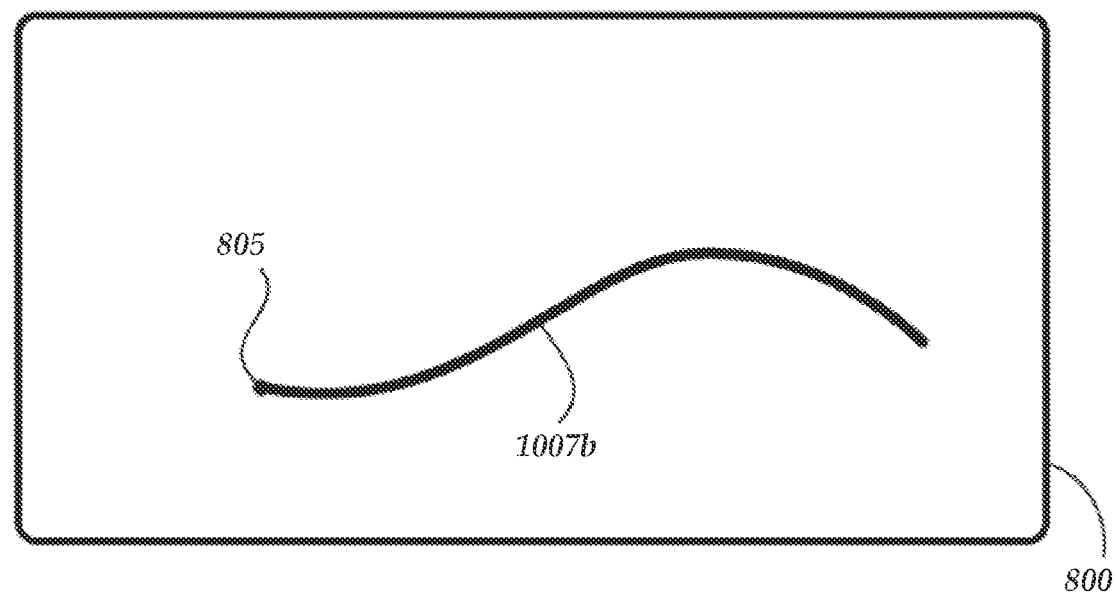
FIG. 10B shows a close-up view of an object imaged by an image sensor in accordance with one or more of the various embodiments.

FIGS. 10A and 10B illustrates paths that may be generated by a sensing system in accordance with one or more of the various embodiments. In this example, for some embodiments, FIG. 10A shows a close-up view of object 809 as the beam may be traced along path 807 in accordance with one or more of the various embodiments. Event points 1007a may be representative of data captured by event sensor 821 and are captured along the entirety of path 807. FIG. 10B shows the same close-up view of object 809 but as imaged by image sensor 811 into a wider path 1007b. Points 1007a are generally captured with lower resolution than the pixels of path 1007b. However, each event point may be in the form of (x, y, t), which has an (x, y) position in the event sensor and also a timestamp t, so that the timing of each point may be precise. A curve (e.g., trajectory), for example a spline, may be fit along event points 1007a to provide a parametric functional form of the events. In some embodiments, this curve (or trajectory) may be calculated at various positions along the path to determine a more precise (x, y, t) at any point along the curve. In some cases, a calculated point, $(x_c, y_c, t_c)$ may have subpixel accuracy more precise than the spatial resolution of the sensor array on the event sensor. Time resolution may be similarly improved, where the accuracy of $t_c$ may be faster than the time resolution of the event sensor. Even with subpixel accuracy of $(x_c, y_c)$ of calculated points from the event sensor measured path, still the imaged pixels may be many times larger than those imaged by the image sensor, which may have 3-10 times as many pixels across the beam profile as measured by path 307b. For example, by calculating the centroid of beam 108, the path position laterally will be quite precise. However, the path centroid 108 will have no time information. Accordingly, in some embodiments, the path as measured by the event sensor has much better information about the position of the beam at any given time, and thus has excellent positional sensitivity in the direction of the spot movement, whereas the path measured by the image sensor has excellent positional sensitivity perpendicular to the spot movement. Combination of these data may provide superresolution of positions and objects scanned by the beam or beams. This may allow capture of finer details than could be taken with either type of sensor alone. Note that these details captured are in the form of 3D paths (e.g., trajectories) and shapes; an image sensor, particularly one with very high resolution, may already be capturing standard image data that has information about some of these very fine details, but that may be not the same as using scanned beams to precisely ascertain the 3D shape. Multiple views from two or more image sensors may be used to improve the resolution of triangulation of the fine details.

Figure 11:
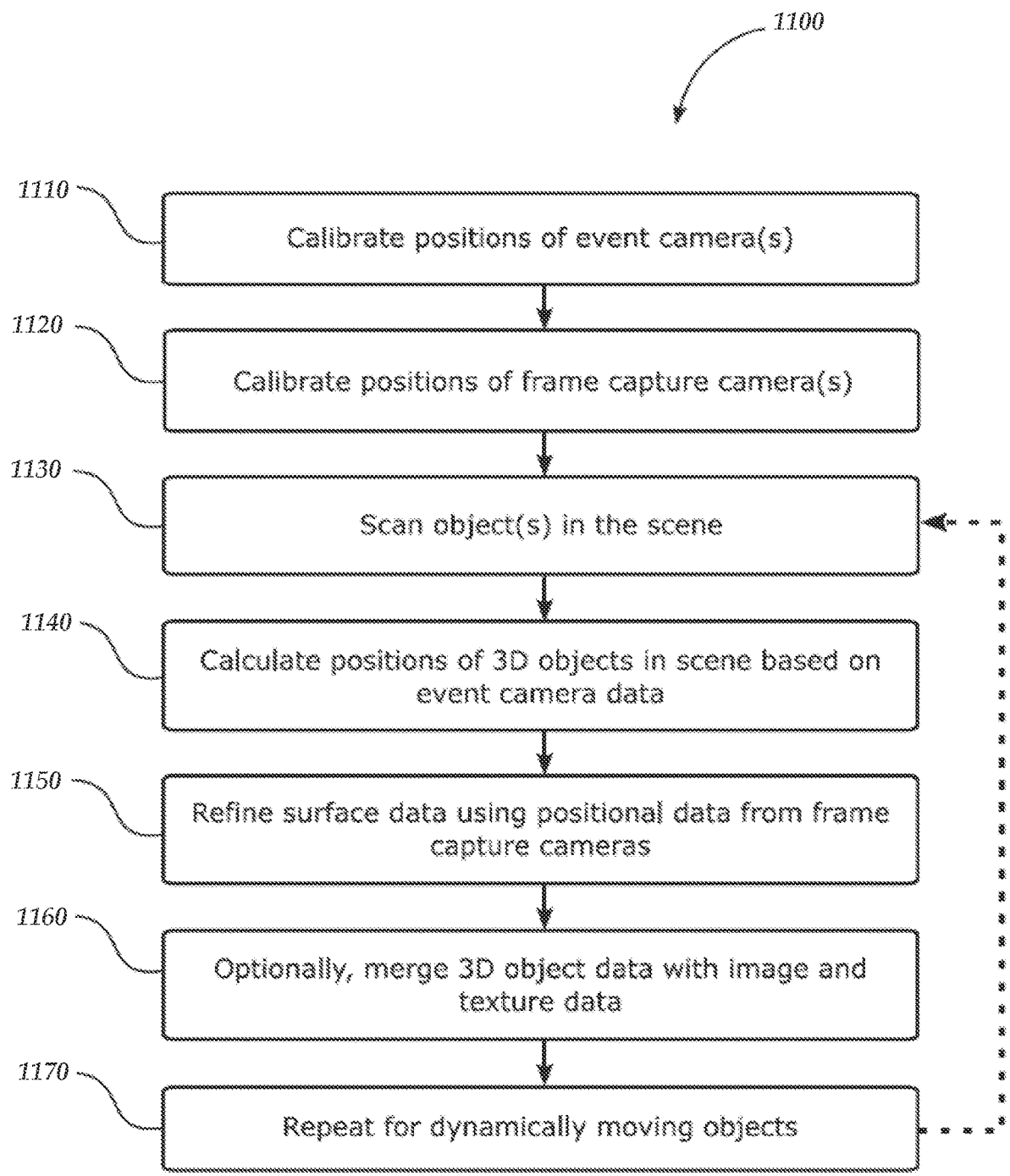
FIG. 11 illustrates a flowchart of a process for multi-sensor superresolution scanning and capture system in accordance with one or more of the various embodiments.

FIG. 11 illustrates a flowchart of process 1100 for multi-sensor superresolution scanning and capture system in accordance with one or more of the various embodiments. At step 1110, in one or more of the various embodiments, the system may be calibrated by first measuring the exact positions and rotations of the event sensors in the system. This may be accomplished in a variety of ways. Generally, a number of 3D fiducial points in a scene can be measured in space and these used to calculate the position of the sensors. Fiducial points may be measured from special calibration targets that have 3D features. Fiducial points can also be ascertained by scanning arbitrary objects with discernable features that can be detected on all of the sensors. In addition, artificial fiducial point could also be generated by crossing a number of scan paths where the crossing points can be seen by all sensors. Once a number of points (at least four points when using three or more event sensors) have been measured in (x, y) coordinates at each event sensor, the positions of the points as well as the sensor positions and rotation angles can be calculated. In a variant, a number of scanned paths can be captured successively at all sensors, and the positions of the sensors calculated using bundle adjustment or other variational methods. Event sensors may be time-synchronized with timing cables, or else event data based on calibrated shapes can be used to mark timestamp discrepancies among the event sensors. Also, in some embodiments, precise calibration information may be determined during the setup and configuration of the sensing system.

In step 1120, in one or more of the various embodiments, the positions of the image sensors are calibrated. Normally this step may be taken after the event sensors are calibrated, but in a variant, in some cases such as using specialized calibration targets or scanning using artificial fiducial points, the positions of the image sensors might be calculated simultaneously with event sensor positions. Although for some image sensors, the frame rate may be set at the sensor, for others the frame rate may be fixed. Depending on this frame rate, for each frame, a sensor might capture one or more distinct paths of a beam that may be scanned across the scene. This may be true if multiple signal generator beams may be used for scanning the scene, but it may also be seen if the scanning rate of the signal generator across the scene may be fast enough so that it makes multiple passes across the objects during the exposure time of a single frame of the image sensor. The image exposure time may be synchronized to the scanning pattern over the scene, but in one embodiment, these are not synchronized, and timing and positioning of data from the event sensor or sensors may be used to delineate which portions of the beam path on the image sensor were generated at particular times. If the paths have been disambiguated, they (or associated artificial fiducial crossing points) can be used in a similar fashion as with the event sensors to calculate positions and rotations of each of the image sensors.

In step 1130, in one or more of the various embodiments, the (signal generator) beam may be scanned over the objects in the scene so that there may be sufficient coverage to discern the shapes of the objects. The term sufficient coverage may be used somewhat loosely. If measuring a static scene, waiting a longer time to fully blanket the surfaces of the objects may be useful to capture fine detail about the shape of the object; when measuring dynamic scenes where either objects are moving, the 3D measurement system may be moving, or both, fewer scans might be desired. Accordingly, in some embodiments, beam coverage may be determined based on configuration information to account for local requirements or local circumstances.

In one embodiment, the input stream of scans may be analyzed continuously in a streaming manner, where all shapes and paths detected can be assembled afterward to create dynamic objects. In a separate embodiment, more than one beam can be used simultaneously to scan the objects of a scene. Because event and image sensors can both detect multiple paths at once, the scans can be more detailed. Multiple lasers can be used to scan the scene, or else a single laser might be split using reflective or diffractive objects. In general, multiple beams may be used for dynamic scanning rather than static points in the 3D space. Whether for single or multiple beams, scanning speed as well as beam power and size are important variables that should be set to achieve best results. The beam power should be set so as to not saturate either type of sensor, though for image sensors, the scanning speed can be set higher to ameliorate this. Accordingly, in some embodiments, beam configuration may be determined based on configuration information to account for local requirements or local circumstances.

In step 1140, in one or more of the various embodiments, objects and their positions and details may be inferred from the path measurements. Points and paths seen at the event sensors from multiple perspectives can then be used in triangulation calculations to find their shapes and positions. Paths, especially ones that cross each other can then be used to create surface meshes to find the 2D surface contour embedded in 3D space of an object. Individual paths can be fit to a time parameterized curve. This data may be refined in step 1150 by adding in path data measured on the image sensors. Paths from the image sensors can be used as data sources on their own, as they are normally at different perspectives from the other sensors and will be useful for removing shadowing and other artifacts. In addition, data from event sensors and image sensors can now be combined. If the sensors have been previously carefully calibrated, the position of any 3D object's surface in the scanned space may be now known. A path or paths as measured by an image sensor can be matched by shape or relative positioning to those from an event sensor. Though the path on the image sensor has no particular time-dependence, when the shape may be matched to a path created by the same laser scan (for example paths 1007a and 1007b in FIGS. 10A and 10B), the path from the image sensor may also be time-parameterized with resolution equal to that of the event sensor. The centroid path 808 of the image sensor may be used to correct less precise positioning as measured on each event sensor. The net result may be superresolution on each sensor's output. Better matching of paths may occur if the path or paths intersect each other on both the image sensor as well as the event sensor. Though the crossing of the paths may not occur simultaneously, the place where the second path to cross a first path will be substantially identical for each sensor viewing the scene at substantially the same time. These crossing points may be used as artificial fiducial points to match curves from the image sensors and the events sensors more precisely.

In one or more of the various embodiments, if the system may be used to measure detailed surface information of the shape alone, the analysis of that particular scan may be complete. However, other data may be now available from the scene, since image sensors are receiving visual data about the scene and objects therein from ambient light reflected from them. In step 1160, in one or more of the various embodiments, texture and other visual data about objects being measured can be added to the model of objects in the scene. A frame capture sensor may detect details about the surface (such as coloring, textures, and other details) that are not present in data from the event sensors. Commonly when doing 3D capture of real-world objects using image sensors, multiple views of the same objects must be run through complicated analyses to combine the data, including convolutional neural nets (CNNs) and other techniques. Each sensor may have its own perspective view which may be transformed from the other sensors, as well as having slightly different information about each object. Matching of various features in scenes solely based on image data from different perspectives has a high degree of computational complexity. This may be made much easier when using the current embodiment, as the precise location and rotation of each of the 3D objects in the sensors fields of view are known. Mapping textures and colors to the objects may be greatly simplified as there may be a one-to-one connection with the pixel data from each image sensor to the object model. Even if there remain noisy artifacts that obscure exact knowledge of the objects or sensors, the pixel discrepancy will be much less with a much smaller search space to find the best overlap. Note that this process does not require rotational or translational overlap of imaged pixel areas from various image sensors before combining their data, since image data can be precisely mapped to the model first.

In one or more of the various embodiments, both the scene picture data as well as the beam paths may be visible in the image sensor data, where the laser might obscure surface and texture details. In practice, this may not be an issue, since the scanning paths of the signal generator rarely repeat the exact same paths over objects, allowing full capture of surface details not obscured by the signal generator beam over the course of a few iterations of scans. However, in an embodiment, the one or more signal generators may be modulated to alternately capture scene with and without scanning beams; this may provide fidelity to details as long as the frame rate of the image sensors may be faster than movements of the objects in the scene.

If the scene may be static, the above method can be repeated to further refine the data. However, these steps can be done repeatedly quite quickly. In step 1170, the method may be repeated again starting at step 1130, allowing dynamic capture of moving objects. In some cases, calibration can also be done relatively quickly as well. In an embodiment, occasionally the process can be restarted back at step 1110, using a dynamic calibration method to account for movement of sensors with respect to each other.

Also, in one embodiment of the invention, focal distances of various sensors may be configured to be different rather than matching. For example, one sensor may be set to focus 2 m away, and another 10 m, and another 50 m. Other variations might include unequal fields of view of the sensors.

In one embodiment, more distinct color sensors can be used. Accordingly, in some embodiments, image sensors may often be used with micro-lenses and color filters in from of each pixel on the image sensor. A common filter may be a Bayer filter with alternating red, green, and blue filters on a per pixel level. Another variation may be to have multiple sensors, each with its own color filter, which have a higher resolution at that color, but would have better optical quality without needing to account for chromatic aberrations. Combination of the various sensors with perfect registration between the 3D scenes could be one result of such a system. Some sensors in a system such as this might have difficulty seeing the laser used for scanning paths across the surface. In one variant, the filters may be switched dynamically. In one variant, the color filter might be removed or replaced with one at the laser's wavelength for calibration or other measurements of the 3D shape, then afterwards the other color filter could be put back in its place. In some embodiments, this may happen at calibration, but in other embodiments, a color wheel may be used to continually alternate between filters. In one embodiment, the color filters used on frame capture sensors may partially saturable; if the laser being used to scan the surface may be sufficiently brighter than the broad spectrum of light otherwise being used to illuminate the objects, it may still be detectable through the filter along with light at the filter's wavelength. In this case, the laser scanning (e.g., signal generator) could be continuous, or may be modulated to allow capture of only the ambient or illuminating light in some frames. In another embodiment, the filters may not be color filters, but instead some sensors may have polarization filters.

Figure 12:
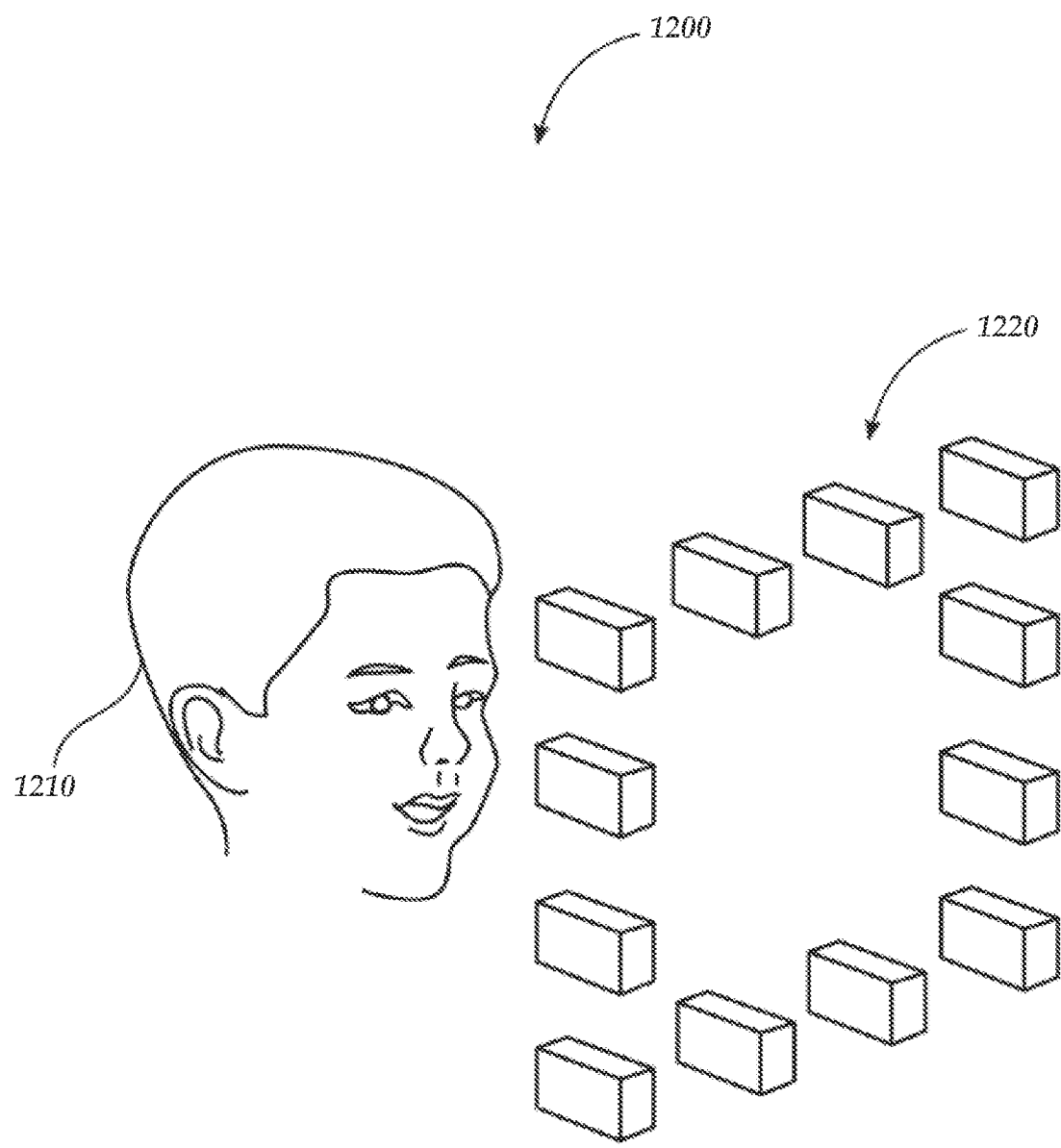
FIG. 12 illustrates a sensing system may also be used for close measurement in accordance with one or more of the various embodiments.

Although sensing system 800 as described may be used at a variety of ranges out to far distance (up to tens of meters), a sensing system may also be used for close measurement. One such embodiment may be depicted in FIG. 12. In this example, system 1200 includes human face 1210 placed relatively close to a scanning system 1220, though other objects than a face might be scanned alternatively. The scanning system 1220 comprises an arbitrary number of event sensors as well as image sensors, aligned in an array so that they have reasonably overlapping fields of view. Overlap may not be very complete by design; for instance, a sensor on the left side of the array may fully see the right ear of the face 1210 but not the left ear, and vice versa for a sensor on the right side of the array, to account for the view being occluded substantially at each sensor. One or more elements of the array can also be beam scanners, although other beam scanners could be located off the array entirely. Such a system should be able to dynamically capture fine movements of the face and skin, including microstructures beneath the skin surface that affect how the skin may be viewed. In an embodiment, a face may be scanned at relatively short wavelength visible light, for example 405 nm. At this wavelength, most of the scanned light may be reflected or scatters off the outer surface of the skin. Fine details of the texture and shape can be discerned with small spot sizes as scanned. image sensors may be much higher resolution, possibly with ten times or more linear resolution of the image sensor array. Texture and color data can then be merged as in step 1160 of process 1100. In close-range scanning, angular disparities of sensors are much more pronounced than with objects at mid-range to far-range. This may lead to less overlap of imaged areas from each sensor as well as significant shadowing. Nevertheless, data from the event sensors may be still able to be composited to create a very accurate mesh model of the position of the outer surface of the face. Even at close distance, because the exact position of the facial object may be known to high accuracy, the position of each frame sensor can be mapped with equal precision relative to the face as well as the other sensors; texture and color can then be mapped to the surface model of the face without high amounts of calculation needed.

The image sensors may also capture images using the ambient or other illuminating light on the face or other object. For the skin of a face, many other details are captured along with the shape of the outer surface of the skin. For instance, as the wavelength hitting the skin increases, the light penetrates farther below the surface of the skin. Light coming back from beneath the surface tends to be blurrier than light coming directly off the surface, as there may be significantly more light scattering within tissue. Determination of substructures beneath the skin can be difficult as finer details do not show up well. However, these details may still be present in the image data even though they may not be obviously present, particularly in the image sensors which are measuring wavelengths longer than the wavelength used to measure the skin surface. In one embodiment, other wavelengths of light are analyzed using the facial model to determine depth details. Here, the outer surface of the skin's position can be determined as previously outlined using lower wavelength light. The position of this model can then be recalculated to represent a similar model with a displaced surface lower than the actual measured surface. In other words, the measured model may be "shrunk" internally to create a new model where the surface of the model may be below the surface of the outer surface by a desired depth, for instance 1.0 mm. As both model positions are known, each position on the new model can also be mapped one-to-one at a pixel level on each sensor.

Figure 13:
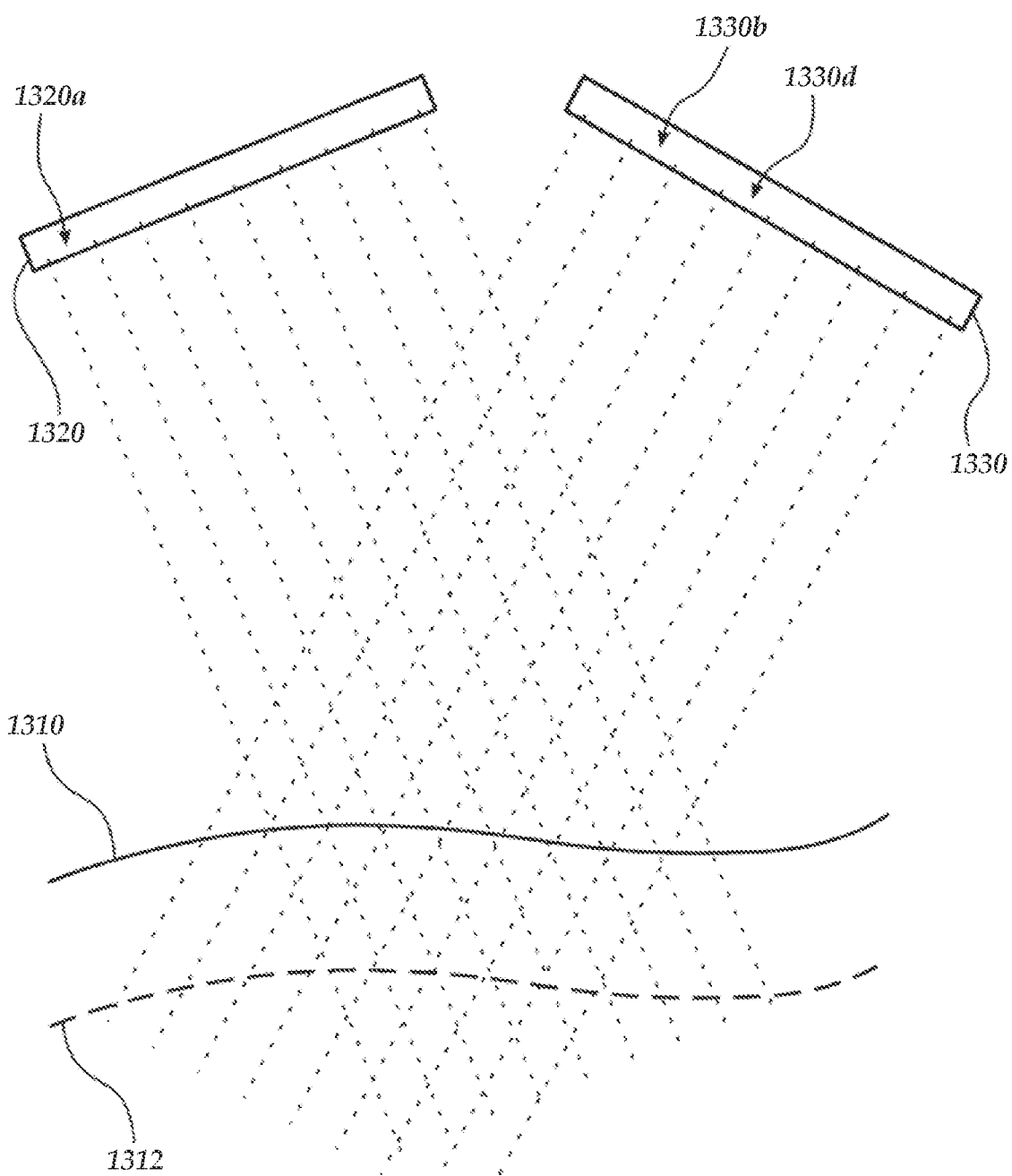
FIG. 13 illustrates a cross section view of the skin as well as sensors imaging it in accordance with one or more of the various embodiments.

This may be illustrated in FIG. 13, which shows a cross section view of the skin as well as sensors imaging it in accordance with one or more of the various embodiments. The skin surface 1310 from the side may be seen by both image sensors 1320 and 1330. The sensors as seen here are here just a subset of the actual sensors; positions and angles of both sensors as well as skin depths may be considered to be exaggerated or otherwise out-of-scale for illustration, and although this may be seen from the side, all sensors are imaging the skin with their 2D image sensor arrays. The skin surface position was measured by event sensors (with other information from the image sensors as well). A theoretical surface 1312 may be then modeled at a desired depth below the surface 1310. In this example, pixel 1320a of sensor 1320 may be substantially imaging the same area as pixel 1330b of sensor 1330. At the calculated surface 1312, the same pixel 1320a substantially images the same area as pixel 1330d of sensor 1330. Though imaging data from below the surface will likely be blurrier than surface image data, it will still be present on each sensor. Moreover, because the pixels imaging at the theoretical surface 1312 can be calculated precisely, one can use data from both sensors to run correlations between them across the whole image sensor array. By correlating over the space discrepancies between the pixels at different depths, this acts as a spatial filter to extract data from the desired depth. Several other image sensors may also be imaging the same portion of the face, and as such multiple correlations could improve the quality of subsurface structure imaged among the sensors. Because other illuminating wavelengths penetrate the skins differently, in a variant, using filters on the sensors could also improve subsurface structure image quality. For example, if each of sensors 1320 and 1330 had a 700 nm narrow band filter in front of their image sensors, a better depth map could be discerned.

In one or more of the various embodiments, cross-correlation between images of the same object can be done, but generally requires images to be registered with one another very well, taking into account not only rotation and translation of the image, but also other optical factors such as zoom, distortion, and other optical qualities of the sensors systems used. By mapping the sensors' positions with respect to each other as well as many points that they both image, this registration does not need to be done first in the current embodiment. The fit model of both the surface 1310 as well as the theoretical surface 1312 may be then mapped precisely to the image pixel space of each image sensor where the correlation may be done. In addition, this process can be done dynamically; for example, it may be difficult for a person's face to remain completely still. If only a snapshot set of images may be required, this matters less, since the imaging of the face can take place faster than movements, however this may be rarely the case. Most often, scanning may be continuously done to update both the images as well as the surface model. In the current embodiment, a face can be continuously scanned, and not only can the surface be mapped, but also the subsurface. If the face changes position between scans, rather than laboriously matching image positions from just image data first, the cross-correlation can be done quickly as accurate repositioning of the face surface model allows for quick calculations of the one-to-one pixel mapping of one sensor space to the other sensor, that may be for image sensor to image sensor, image sensor to event sensor, or event sensor to event sensor.

Note that FIG. 13 may be described as applying to the skin of a face, but other objects could also be used to obtain structure below the outside surface of other objects using this method, as long as the material of the object may be either transparent, highly translucent, or even partially translucent with a high degree of light scattering.

In one or more of the various embodiments, other details might also be available to the image sensors when matched with the face surface model. Deformation of skin and other structures causes changes in both the texture of the skin surface as well as changes underneath the surface. This may change not only the visible texture as seen by a sensor, but also other factors such as shine, reflectivity, anisotropic polarization, or other non-Lambertian scattering or reflection. These can also be seen dynamically as the face moves and mapped precisely to the face model.

Furthermore, it will be understood that each block in flowchart illustration FIG. 11, and combinations of blocks in flowchart FIG. 11, may be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of flowchart FIG. 11 to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, each block in the flowchart illustration supports combinations of means for performing the specified actions, combinations of steps for performing the specified actions and program instruction means for performing the specified actions. It will also be understood that each block in the flowchart illustration, and combinations of blocks in the flowchart illustration, may be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowchart may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a micro-controller may be arranged to directly execute its own embedded logic to perform actions and access its own internal memory and its own external Input and Output Interfaces (e.g., hardware pins or wireless transceivers) to perform actions, such as System On a Chip (SOC), or the like.

Figure 14A:
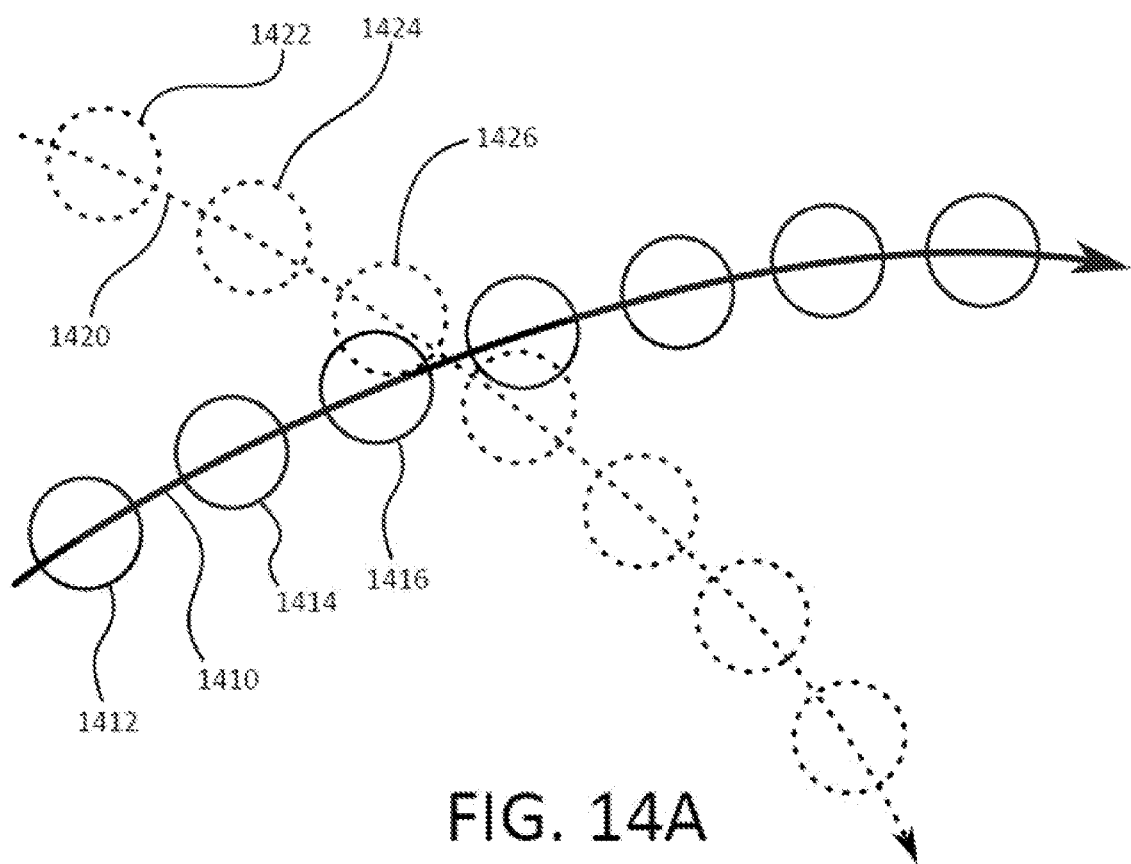
FIG. 14A illustrates a logical schematic of a system for multi-sensor superresolution scanning and capture system in accordance with one or more of the various embodiments.
Figure 14B:
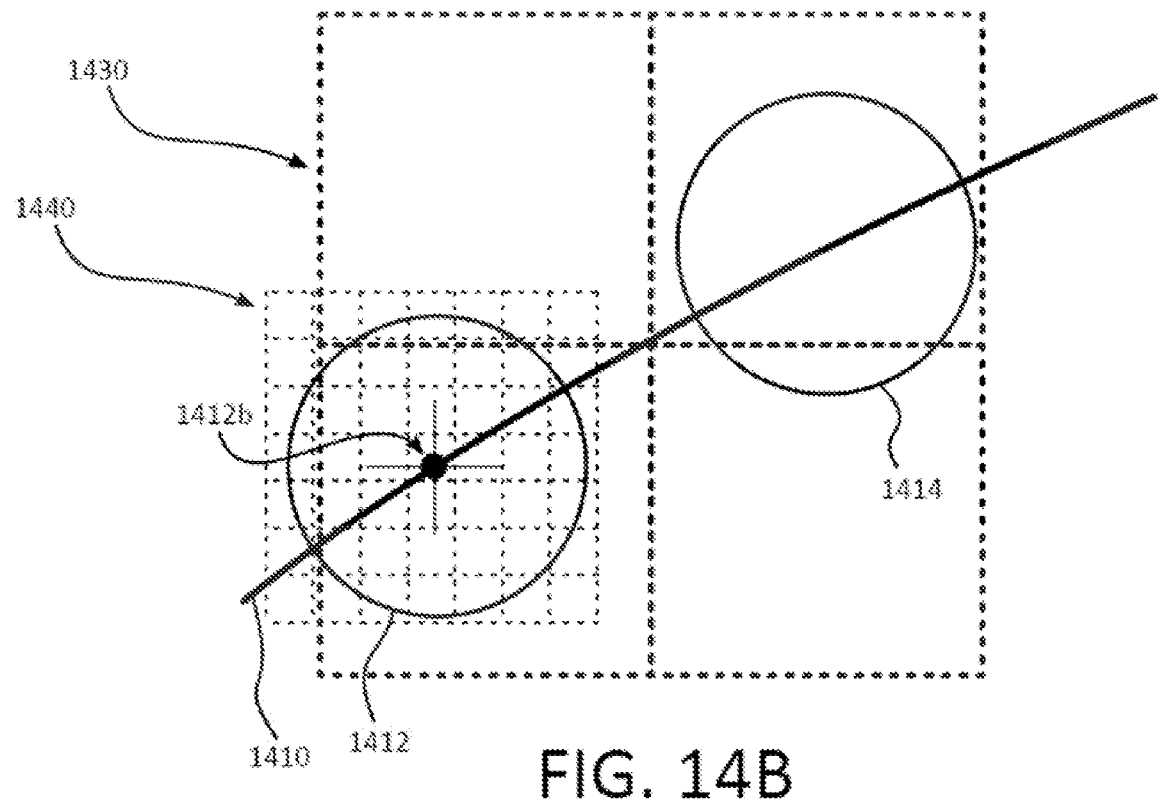
FIG. 14B illustrates a logical schematic of a system for multi-sensor superresolution scanning and capture system in accordance with one or more of the various embodiments.

In some embodiments (similar to that shown in FIG. 9C) if the laser (e.g., signal generator) may be modulated or pulsed to create instantaneous spots on objects in the scene, additional information may be generated by combining data from both event sensors and image sensor. In an example, if beams are turned on for 100 ns with a repeat rate of 1 MHz, then the result may look similar to a spot pattern as shown in FIG. 14A. In some embodiments, actual duty cycles of the beam may vary from these numbers so that the beam spots remain reasonably distinct; although a continuous beam may be mapped and fitted to precisely to timestamps, this may be less likely for image sensors that run at slower frame rates. Duty cycles of beam modulation may be chosen to match event camera resolution rates, or could be selected independently. In some embodiments, the time on and off parameters may be selected such that individual spots of each trajectory may be individually captured on the image sensor. In some embodiments, the length of time where a laser may be turned on may result in a captured spot that may be substantially similar to the shape profile of the beam. In some embodiments, the beam may be left on longer; in this case, there may be some motion blurring such that the shape of the captured spot may be somewhat oval. In either case, the centroids of the beam spots may be determined and correlated to event sensor data. For example, trajectory 1410 and trajectory 1420 are depicted in the figure; a number of individual spots may be captured as well, some of them labeled as spot 1412, spot 1414, and spot 1416. Similarly, trajectory 1420 may have spots, such as, spot 1422, spot 1424, and spot 1426 along with others. A close-up view of trajectory 1410 is shown in FIG. 14B. In this example, grid 1430 may be representative of the captured view of event sensor pixels on one of the event sensors watching the scene; one or more image sensors can also be measuring these spots as well. Grid 1430 may be representative of the captured view of image sensor pixels on one of the image sensors watching the scene (not shown to scale for clarity).

In some embodiments, spot 1412 may trigger one or more pixels in each event sensor; event sensor parameters may be configured so that individual beam spots can trigger thresholds in the sensor so that spots are detectable. The timing of the spots triggering may be correlated down to the time resolution of each event sensor. Though the beam may be not scanning continuously in this mode, there may remain a strong correlation for the beam movement, and as such, a trajectory 1410 may be able to be inferred from the various events corresponding to spots captured along the trajectory (e.g., trajectory 1412, trajectory 1414, trajectory 1416). In some cases, timestamps of the events corresponding to spots may be further refined by matching to the smooth shape of the trajectory. At the same time, images captured on the image sensor may be associated with spots captured on the event sensor. In an example where the linear resolution of an image sensor is ten times higher than an event camera, then if one pixel triggers on an event camera, then up to 100 pixels may show grayscale signal above the background noise. With a Gaussian or other repeatable beam profile, the centroid 1412b of spot 1412 may be calculated with high precision compared to the (X, Y) position on the event sensor. In our example, where the image sensor has a linear resolution ten times higher than the event camera, it may appear that the (X, Y) position may be increased by a factor of ten compared to that seen on the event camera. However, this understates the potential improvement; when fitting the centroid of a Gaussian beam on the image sensor, where grayscale images can be seen over the beam profile, the centroid can be estimated at a subpixel level. This is a subpixel level of the image sensor array, so if the (X, Y) position could be calculated down to 0.1 pixels in each dimension, then in the event camera space this corresponds to estimating the position with an accuracy of 0.01 pixels. This can be seen by comparing relative sizes of event camera grid 1430 and image sensor grid 1440. Higher accuracy on the image sensor may be possible as well, with further associated improvement at the event camera space. In this embodiment, the (X, Y) position of each spot may be inferred from the image sensor while the timestamp of the events corresponding to that spot can be used for the exact timing of that spot. This portion corresponds to step 1150 of process 1100.

In some embodiments, time correlation of each measured spot could be calculated in a different manner, where the timestamps of the event camera data are used for spot sequencing rather than as exact timestamps. Using our previous example, where a laser is modulated so that it is turned on at a 1 MHz rate (that is, every 1 μs) for 100 ns at a time, spots can be measured at each event camera with associated timestamps. Because the timestamps of spots as measured across a trajectory are monotonically increasing, both the timestamps as well as the spatial positions on the event camera can be used to assign which spot belongs to which timestamp and assign an order to them over time. Because the modulation rate can be precisely controlled on the laser, regardless of the actual measured timestamp, the precise timing of each pulse of the laser can be determined as well. In our example, spots 1412, 1414, and 1416 will hit the target substantially 1 μs apart. The actual timestamp can vary by 1 or more μs based on various factors, such as where the spot hits on the event sensor array, timing of the pulse compared to the time base triggering of the event cameras, and other factors, but nevertheless the actual time can be assigned precisely. In turn, when the spots of the event cameras are associated with the precise linear positions of the spots on the multiple image sensors, they can be assigned both a highly precise position and time with this method.

Also, in some embodiments, spatial correlation between the types of sensors may be done in more than one way. In some embodiments, image sensors may be configured to be substantially co-located each with an event sensor. In this case, the positions of spots within each pair of event sensor/image sensor may be well-correlated, and the data from the pair may then be combined with other sets of spot positions if calculating positions of 3D objects in step 1140. In some embodiments, because timestamps associated with individual spots may be synchronized among the various event sensors, multiple spots and beams scanned may be measured simultaneously. In some embodiments, the various event sensors and image sensors may be spatially distributed similar to that shown in FIG. 8. In this case, because each sensors position may be well-calibrated, spots from image sensors may be correlated by position with those from various event sensors. The spots alone may be correlated among sensors, but this may be aided by grouping spots derived from single trajectories such as trajectory 1410 or trajectory 1420. Spots creating trajectories may be more easily assigned using event sensor data, since each spot may be spatially and temporally correlated with adjacent spots from the same trajectory. Once this has been done, the set of spots may be matched with those from the image sensors using epipolar geometry, graph crossings, bundle adjustment, or other methods. These methods may be used to correlate an arbitrary number of event sensors and image sensors, which may be capable of reading spot locations from five, ten, or more concurrently scanning beams. One of the main limitations is that of number of spots captured on the image sensors in any one frame captured. Results may be improved if there may be fewer intersections among trajectories in a single frame. For example, spot 1416 and spot 1426 from different trajectories may still be captured within the same sensor frame on a particular image sensor. If they remain distinct enough, centroids of multiple beam spots might still be able to be extracted, but if there may be too much overlap, the image sensor might become oversaturated, which may make this process more difficult. In this case, overlapping portions may be excluded from the analysis, which may still leave sufficient data to calculate 3D surface positions over time. Nevertheless, there may within the time window of a single frame of an image sensor be many spots on the sensor captured corresponding to a number of simultaneous or sequential trajectories. If event camera data were not used for the purpose of identifying and matching which spots on various cameras correspond to each other, then processing of image sensor data alone between the various image sensor views could be extremely computationally intensive. By using event camera data to sequence and identify laser spots captured, computation required may be reduced by many orders of magnitude. This is possible because each spot will have a high-resolution location from the image sensor data, a clearly identified trajectory it belongs to assigned by event camera data, as well as a unique timestamp that can be correlated between the cameras with a known ground truth time based on modulation of the laser or lasers.

What is claimed as new and desired to be protected by Letters Patent of the United States is:

1. A method for perceiving surfaces and objects using one or more processors that are configured to execute instructions, wherein the executed instructions enable performance of actions, comprising:
   employing a sensing system to scan a plurality of paths across one or more objects using one or more beams, wherein the sensing system includes one or more event sensors and one or more image sensors, and wherein the one or more image sensors are a higher resolution than the one or more event sensors;
   employing the one or more event sensors to provide one or more events that detect one or more of a movement, a shape, or a position for the one or more objects with one or more points for each cell location for each event sensor that is triggered based on detection of one or more portions of the one or more beams that are reflected by the one or more objects;
   employing the one or more image sensors to provide one or more images based on the one or more reflected portions of the one or more beams;
   generating a plurality of first trajectories based on the one or more events and one or more event paths, wherein the one or more points and the one or more event paths are employed to determine one or more event time parameterized curves for the one or more events;
   generating a plurality of second trajectories based on the one or more images and one or more image paths that match the one or more event paths, wherein the one or more matched image paths are employed to determine one or more image time parameterized curves for the one or more images;
   generating one or more enhanced trajectories based on a combination of the plurality of first trajectories and the plurality of second trajectories by matching the one or more event time parameterized curves to the one or more image time parameterized curves; and providing the one or more enhanced trajectories to a modeling engine, wherein the one or more enhanced trajectories provide super resolution of an output of the sensing system, and wherein the modeling engine executes one or more actions based on the one or more enhanced trajectories and the one or more objects.

2. The method of claim 1, wherein executing one or more actions based on the one or more enhanced trajectories and the one or more objects, further comprises:
generating one or more three-dimensional models of the one or more objects based on the one or more enhanced trajectories;
determining image data and texture data associated with the one or more objects based on the one or more images captured by the one or more image sensors; and
mapping the image data and texture data to the three-dimensional model based on the one or more enhanced trajectories.

3. The method of claim 1, further comprising:
modulating the one or more beams, wherein the modulation includes an off-cycle and an on-cycle;
employing the one or more image sensors to capture a portion of one or more images during the modulation off-cycle, wherein the portion of the one or more images is provided absent the one or more portions of the one or more beams being reflected by the one or more objects; and
determining one or more features of the one or more objects based on the portion of the one or more images that are provided absent the one or more portions of the one or more beams being reflected by the one or more objects.

4. The method of claim 1, further comprising:
providing the one or more image sensors, wherein one or more portions of the one or more image sensors include one or more of a color filter, a polarization filter, or a micro-lens; and
employing the one or more portions of the one or more image sensors to capture one or more features of the one or more objects that are associated with the one or more of the color filter, the polarization filter, or the micro-lens included in the one or more portions of the one or more image sensors.

5. The method of claim 1, wherein generating one or more enhanced trajectories, further comprises:
associating one or more portions of the plurality of first trajectories with one or more portions of the plurality of second trajectories based on an equivalence of a shape of the one or more associated portions of the plurality of first trajectories and the shape of the one or more associated portions of the plurality of second trajectories;
determining time information that corresponds to one or more portions of the one or more events that are associated with the one or more associated portions of the plurality of first trajectories; and
including the time information in the one or more enhanced trajectories.

6. The method of claim 1, wherein the plurality of second trajectories, further comprises:
determining one or more centroid paths that correspond to the one or more paths based on a signal strength distribution that corresponds to the one or more portions of the one or more beams reflected by the one or more objects and detected by the one or more image sensors; and
employing the one or more centroid paths to generate the plurality of second trajectories.

7. The method of claim 1, wherein generating the one or more enhanced trajectories, further comprises:
providing a higher resolution for the one or more enhanced trajectories than other resolutions for the first and second pluralities of trajectories.

8. A system for perceiving surfaces and objects, comprising:
a network computer, comprising:
a memory that stores at least instructions; and
one or more processors configured to execute the instructions that are configured to cause performance of actions, including:
employing a sensing system to scan a plurality of paths across one or more objects using one or more beams, wherein the sensing system includes one or more event sensors and one or more image sensors, and wherein the one or more image sensors are a higher resolution than the one or more event sensors;
employing the one or more event sensors to provide one or more events that detect one or more of a movement, a shape, or a position for the one or more objects with one or more points for each cell location for each event sensor that is triggered based on detection of one or more portions of the one or more beams that are reflected by the one or more objects;
employing the one or more image sensors to provide one or more images based on the one or more reflected portions of the one or more beams;
generating a plurality of first trajectories based on the one or more events and one or more event paths, wherein the one or more points and the one or more event paths are employed to determine one or more event time parameterized curves for the one or more events;
generating a plurality of second trajectories based on the one or more images and one or more image paths that match the one or more event paths, wherein the one or more matched image paths are employed to determine one or more image time parameterized curves for the one or more images;
generating one or more enhanced trajectories based on a combination of the plurality of first trajectories and the plurality of second trajectories by matching the one or more event time parameterized curves to the one or more image time parameterized curves; and
providing the one or more enhanced trajectories to a modeling engine, wherein the one or more enhanced trajectories provide super resolution of an output of the sensing system, and wherein the modeling engine executes one or more actions based on the one or more enhanced trajectories and the one or more objects; and
a client computer, comprising:
a client memory that stores at least instructions; and
one or more client processors configured to execute the instructions that are configured to cause performance of actions, including:
providing one or more portions of the plurality of events or providing one or more portions of the plurality of images.

9. The system of claim 8, wherein executing one or more actions based on the one or more enhanced trajectories and the one or more objects, further comprises:
   generating one or more three-dimensional models of the one or more objects based on the one or more enhanced trajectories;
   determining image data and texture data associated with the one or more objects based on the one or more images captured by the one or more image sensors; and
   mapping the image data and texture data to the three-dimensional model based on the one or more enhanced trajectories.

10. The system of claim 8, wherein the one or more processors of the network computer are configured to execute the instructions, wherein the instructions are configured to cause performance of actions further comprising:
   modulating the one or more beams, wherein the modulation includes an off-cycle and an on-cycle;
   employing the one or more image sensors to capture a portion of one or more images during the modulation off-cycle, wherein the portion of the one or more images is provided absent the one or more portions of the one or more beams being reflected by the one or more objects; and
   determining one or more features of the one or more objects based on the portion of the one or more images that are provided absent the one or more portions of the one or more beams being reflected by the one or more objects.

11. The system of claim 8, wherein the one or more processors of the network computer are configured to execute the instructions, wherein the instructions are configured to cause performance of actions further comprising:
   providing the one or more image sensors, wherein one or more portions of the one or more image sensors include one or more of a color filter, a polarization filter, or a micro-lens; and
   employing the one or more portions of the one or more image sensors to capture one or more features of the one or more objects that are associated with the one or more of the color filter, the polarization filter, or the micro-lens included in the one or more portions of the one or more image sensors.

12. The system of claim 8, wherein generating one or more enhanced trajectories, further comprises:
   associating one or more portions of the plurality of first trajectories with one or more portions of the plurality of second trajectories based on an equivalence of a shape of the one or more associated portions of the plurality of first trajectories and the shape of the one or more associated portions of the plurality of second trajectories;
   determining time information that corresponds to one or more portions of the one or more events that are associated with the one or more associated portions of the plurality of first trajectories; and
   including the time information in the one or more enhanced trajectories.

13. The system of claim 8, wherein the plurality of second trajectories, further comprises:
   determining one or more centroid paths that correspond to the one or more paths based on a signal strength distribution that corresponds to the one or more portions of the one or more beams reflected by the one or more objects and detected by the one or more image sensors; and
   employing the one or more centroid paths to generate the plurality of second trajectories.

14. The system of claim 8, wherein generating the one or more enhanced trajectories, further comprises:
   providing a higher resolution for the one or more enhanced trajectories than other resolutions for the first and second pluralities of trajectories.

15. A network computer for perceiving surfaces and objects, comprising:
   a memory that stores at least instructions; and
   one or more processors configured to execute the instructions, wherein the instructions are configured to cause performance of actions, including:
      employing a sensing system to scan a plurality of paths across one or more objects using one or more beams, wherein the sensing system includes one or more event sensors and one or more image sensors, and wherein the one or more image sensors are a higher resolution than the one or more event sensors;
      employing the one or more event sensors to provide one or more events that detect one or more of a movement, a shape, or a position for the one or more objects with one or more points for each cell location for each event sensor that is triggered based on detection of one or more portions of the one or more beams that are reflected by the one or more objects;
      employing the one or more image sensors to provide one or more images based on the one or more reflected portions of the one or more beams;
      generating a plurality of first trajectories based on the one or more events and one or more event paths, wherein the one or more points and the one or more event paths are employed to determine one or more event time parameterized curves for the one or more events;
      generating a plurality of second trajectories based on the one or more images and one or more image paths that match the one or more event paths, wherein the one or more matched image paths are employed to determine one or more image time parameterized curves for the one or more images;
      generating one or more enhanced trajectories based on a combination of the plurality of first trajectories and the plurality of second trajectories by matching the one or more event time parameterized curves to the one or more image time parameterized curves; and
      providing the one or more enhanced trajectories to a modeling engine, wherein the one or more enhanced trajectories provide super resolution of an output of the sensing system, and wherein the modeling engine executes one or more actions based on the one or more enhanced trajectories and the one or more objects.

16. The network computer of claim 15, wherein executing one or more actions based on the one or more enhanced trajectories and the one or more objects, further comprises:
   generating one or more three-dimensional models of the one or more objects based on the one or more enhanced trajectories;
   determining image data and texture data associated with the one or more objects based on the one or more images captured by the one or more image sensors; and
   mapping the image data and texture data to the three-dimensional model based on the one or more enhanced trajectories.

17. The network computer of claim 15, wherein the one or more processors are configured to execute the instructions, wherein the instructions are configured to cause performance of actions further comprising:
modulating the one or more beams, wherein the modulation includes an off-cycle and an on-cycle;
employing the one or more image sensors to capture a portion of one or more images during the modulation off-cycle, wherein the portion of the one or more images is provided absent the one or more portions of the one or more beams being reflected by the one or more objects; and
determining one or more features of the one or more objects based on the portion of the one or more images that are provided absent the one or more portions of the one or more beams being reflected by the one or more objects.

18. The network computer of claim 15, wherein the one or more processors are configured to execute the instructions, wherein the instructions are configured to cause performance of actions further comprising:
providing the one or more image sensors, wherein one or more portions of the one or more image sensors include one or more of a color filter, a polarization filter, or a micro-lens; and
employing the one or more portions of the one or more image sensors to capture one or more features of the one or more objects that are associated with the one or more of the color filter, the polarization filter, or the micro-lens included in the one or more portions of the one or more image sensors.

19. The network computer of claim 15, wherein generating one or more enhanced trajectories, further comprises:
associating one or more portions of the plurality of first trajectories with one or more portions of the plurality of second trajectories based on an equivalence of a shape of the one or more associated portions of the plurality of first trajectories and the shape of the one or more associated portions of the plurality of second trajectories;
determining time information that corresponds to one or more portions of the one or more events that are associated with the one or more associated portions of the plurality of first trajectories; and
including the time information in the one or more enhanced trajectories.

20. The network computer of claim 15, wherein the plurality of second trajectories, further comprises:
determining one or more centroid paths that correspond to the one or more paths based on a signal strength distribution that corresponds to the one or more portions of the one or more beams reflected by the one or more objects and detected by the one or more image sensors; and
employing the one or more centroid paths to generate the plurality of second trajectories.

21. The network computer of claim 15, wherein generating the one or more enhanced trajectories, further comprises:
providing a higher resolution for the one or more enhanced trajectories than other resolutions for the first and second pluralities of trajectories.

22. A processor readable non-transitory storage media that includes instructions for perceiving surfaces and objects, wherein execution of the instructions, by one or more processors, on one or more network computers causes performance of actions, comprising:
employing a sensing system to scan a plurality of paths across one or more objects using one or more beams, wherein the sensing system includes one or more event sensors and one or more image sensors, and wherein the one or more image sensors are a higher resolution than the one or more event sensors;
employing the one or more event sensors to provide one or more events that detect one or more of a movement, a shape, or a position for the one or more objects with one or more points for each cell location for each event sensor that is triggered based on detection of one or more portions of the one or more beams that are reflected by the one or more objects;
employing the one or more image sensors to provide one or more images based on the one or more reflected portions of the one or more beams;
generating a plurality of first trajectories based on the one or more events and one or more event paths, wherein the one or more points and the one or more event paths are employed to determine one or more event time parameterized curves for the one or more events;
generating a plurality of second trajectories based on the one or more images and one or more image paths that match the one or more event paths, wherein the one or more matched image paths are employed to determine one or more image time parameterized curves for the one or more images;
generating one or more enhanced trajectories based on a combination of the plurality of first trajectories and the plurality of second trajectories by matching the one or more event time parameterized curves to the one or more image time parameterized curves; and
providing the one or more enhanced trajectories to a modeling engine, wherein the one or more enhanced trajectories provide super resolution of an output of the sensing system, and wherein the modeling engine executes one or more actions based on the one or more enhanced trajectories and the one or more objects.

23. The media of claim 22, wherein executing one or more actions based on the one or more enhanced trajectories and the one or more objects, further comprises:
generating one or more three-dimensional models of the one or more objects based on the one or more enhanced trajectories;
determining image data and texture data associated with the one or more objects based on the one or more images captured by the one or more image sensors; and
mapping the image data and texture data to the three-dimensional model based on the one or more enhanced trajectories.

24. The media of claim 22, further comprising:
modulating the one or more beams, wherein the modulation includes an off-cycle and an on-cycle;
employing the one or more image sensors to capture a portion of one or more images during the modulation off-cycle, wherein the portion of the one or more images is provided absent the one or more portions of the one or more beams being reflected by the one or more objects; and
determining one or more features of the one or more objects based on the portion of the one or more images that are provided absent the one or more portions of the one or more beams being reflected by the one or more objects.

25. The media of claim 22, further comprising:
providing the one or more image sensors, wherein one or more portions of the one or more image sensors include one or more of a color filter, a polarization filter, or a micro-lens; and employing the one or more portions of the one or more image sensors to capture one or more features of the one or more objects that are associated with the one or more of the color filter, the polarization filter, or the micro-lens included in the one or more portions of the one or more image sensors.

26. The media of claim 22, wherein generating one or more enhanced trajectories, further comprises:
associating one or more portions of the plurality of first trajectories with one or more portions of the plurality of second trajectories based on an equivalence of a shape of the one or more associated portions of the plurality of first trajectories and the shape of the one or more associated portions of the plurality of second trajectories;
determining time information that corresponds to one or more portions of the one or more events that are associated with the one or more associated portions of the plurality of first trajectories; and
including the time information in the one or more enhanced trajectories.

27. The media of claim 22, wherein the plurality of second trajectories, further comprises:
determining one or more centroid paths that correspond to the one or more paths based on a signal strength distribution that corresponds to the one or more portions of the one or more beams reflected by the one or more objects and detected by the one or more image sensors; and
employing the one or more centroid paths to generate the plurality of second trajectories.

28. The media of claim 22, wherein generating the one or more enhanced trajectories, further comprises:
providing a higher resolution for the one or more enhanced trajectories than other resolutions for the first and second pluralities of trajectories.

\* \* \* \* \*